US 9,808,833 B1

(12) United States Patent
Walker et al.

(10) Patent No.: US 9,808,833 B1
(45) Date of Patent: Nov. 7, 2017

(54) HYDRAULIC LOG YARD WASTE SEPARATION SYSTEM AND METHOD

(71) Applicant: Walker DeRocker LLC, Days Creek, OR (US)

(72) Inventors: James R. Walker, Days Creek, OR (US); Mike L. Morris, Days Creek, OR (US)

(73) Assignee: WALKER DEROCKER, LLC, Days Creek, OR (US)

( * ) Notice: Subject to any disclaimer, the term of this patent is extended or adjusted under 35 U.S.C. 154(b) by 157 days.

(21) Appl. No.: 15/015,328

(22) Filed: Feb. 4, 2016

Related U.S. Application Data

(60) Provisional application No. 62/241,800, filed on Oct. 15, 2015.

(51) Int. Cl.
| | |
|---|---|
| *B07C 5/14* | (2006.01) |
| *B07B 9/02* | (2006.01) |
| *B07B 4/02* | (2006.01) |
| *B07B 11/04* | (2006.01) |
| *B07B 11/06* | (2006.01) |
| *B27G 3/00* | (2006.01) |
| *B07B 15/00* | (2006.01) |

(52) U.S. Cl.
CPC .................. *B07B 9/02* (2013.01); *B07B 4/02* (2013.01); *B07B 11/04* (2013.01); *B07B 11/06* (2013.01); *B27G 3/00* (2013.01); *B07B 15/00* (2013.01); *B65G 2201/0282* (2013.01)

(58) Field of Classification Search
CPC .. B07B 4/02; B07B 9/02; B07B 11/04; B07B 11/06; B07B 15/00; B07C 5/14; B07C 5/38; B27G 3/00; B65G 47/34; B65G 47/44; B65G 67/12; B65G 2201/0282

USPC .......................................................... 209/517
See application file for complete search history.

(56) References Cited

U.S. PATENT DOCUMENTS

| | | | |
|---|---|---|---|
| 3,746,063 | A | 7/1973 | Smiltneek |
| 3,834,561 | A | 9/1974 | Crow |
| 4,826,018 | A | 5/1989 | Lemmons |
| 4,865,720 | A | 9/1989 | Gilmore |
| 5,009,370 | A | 4/1991 | Mackenzie |

(Continued)

FOREIGN PATENT DOCUMENTS

DE            4117029            11/1992

*Primary Examiner* — Joseph C Rodriguez
*Assistant Examiner* — Kalyanavenkateshware Kumar
(74) *Attorney, Agent, or Firm* — Jerry Haynes Law

(57) ABSTRACT

A hydraulic separation system and method enables efficient recycling of log yard waste from an elevated frame. The system separates fine granules, small rocks, small bark, large bark, and large rocks with a variety of sequentially positioned, hydraulically powered separating components. The separation is mechanical and the size and weight of the individual material determines where in the system it is separated. Conveyors carry the log yard waste through the system. Shaking screens shake in a fast, up and down motion to flip and move the material through the system. Adjustable sloped plates work to accelerate and decelerate the material through the system. Dampening fingers control the disposition of elongated pieces of large bark and help to decelerate down the material. Blowers separate the bark from heavier rock and granular material. The elevated frame to enable cleaning and access to materials discharged beneath the elevated frame.

20 Claims, 16 Drawing Sheets

(56) References Cited

U.S. PATENT DOCUMENTS

| | | | |
|---|---|---|---|
| 5,240,114 A | | 8/1993 | Parker et al. |
| 5,361,909 A | | 11/1994 | Gemmer |
| 5,611,493 A | * | 3/1997 | Hayashi ................ B02C 13/282 |
| | | | 241/23 |
| 5,947,395 A | | 9/1999 | Peterson et al. |
| 5,992,774 A | * | 11/1999 | Oh ......................... B03B 9/065 |
| | | | 209/12.1 |
| 6,306,248 B1 | | 10/2001 | Eley |
| 2013/0126401 A1 | | 5/2013 | Samarkos |

* cited by examiner

HYDRAULIC LOG YARD WASTE SEPARATION SYSTEM AND METHOD

CROSS REFERENCE OF RELATED APPLICATIONS

This application claims the benefits of U.S. provisional application No. 62/241,800, filed Oct. 15, 2015 and entitled HYDRAULIC LOG YARD WASTE SEPARATION SYSTEM AND METHOD, which provisional application is incorporated by reference herein in its entirety.

FIELD OF THE INVENTION

The present invention relates generally to a hydraulic log yard waste separation system and method for separating and reclaiming log yard waste. More so, the present invention relates to a hydraulic separation system and method that enables efficient recycling of log yard waste from an elevated frame by separating fine granules, small rocks, small bark, large bark, and large rocks with a variety of sequential separating components, including: a hydraulic powered conveyor that carries the log yard waste through a series of hydraulic powered separating components; a shaking screen that moves in a fast, up and down motion to flip and move the material; adjustable sloped plates that accelerate and decelerate the log yard waste material; dampening fingers that control the disposition of elongated pieces of large bark; and blowers that separates the bark from heavier rock and granular material; whereby use of hydraulic power allows for better adjustability of the conveyors, blowers, and shaker speeds, greater portability of the system and reduces fire hazards; whereby the system operates on an elevated frame to enable cleaning and access to materials discharged beneath the elevated frame.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Often, log yard wastes are typically bark and woodchips mixed with soil, oversized logs and undersized limbs, metal-containing logs, and mold damaged chips. Typically, log yard waste for sawmills forms the largest solid waste stream. Sawmills with on-site landfills will often use some of this material as landfill cover, but there is often more waste than needed for this purpose.

It is known that a continuing problem in log yards is the accumulation of log debris. The log debris often becomes mingled with rock and soil, forming an aggregate. Attempts to stabilize the wet aggregate to improve traction for equipment results in additional gravel and rock being added. Decomposition of the wood portion of the aggregate results in the production of noxious by-products that are more frequently being viewed as environmentally unacceptable. The aggregate is essentially a combination of three particulate components, namely high density mineral particles, low density wood particles, and relatively fine soil particles.

Log yard operators have, to date, sought methods to treat the mixtures, with unsatisfactory results. Often, attempts are made to separate mixtures of wood pieces, rock, and soil particles so that the components of the mixture can be reused. In one commonly used process, disk screens are used for separating the mixture into small particles, which are a mixture of soil particles and small wood particles, large wood chunks, and a mixture of gravel size rock and wood pieces of about the same size. Additional attempts have been made to separate the rock from the wood pieces by air streams and the force of gravity, with varying degrees of success.

Those skilled in the art are familiar that other log yard waste separation techniques tried have included flotation for separating the wood from the mineral portion, expecting the wood to readily float free. This approach has been unsuccessful due to the large fraction of wood that is waterlogged and will not float. Additionally, the water used for flotation becomes contaminated and becomes a further liability.

It is known that sawmill logs are increasingly being stored on land rather than in log ponds so as to reduce water pollution. Usually these log storage yards are bedded with gravel. As the logs are moved into and out of the storage yard, chunks of bark and other wood debris fall from the logs and mix with the gravel. This yard bark is removed periodically from the yard to keep the yard clean and reduce the fire hazard. One common method of removal is to scoop up the gravel-bark mixture with a front end loader-type vehicle and dump it someplace as waste. This results, however, in the removed gravel and bark being a complete loss. And thus, the gravel must be replaced with new gravel at considerable expense. Additional expense is involved in transporting the bark-gravel mix to a dumping site.

It is also known that air separation or elutriation techniques have also been attempted in the past. The difficulty with typical elutriation techniques is that they are as likely to lift and separate out small particles of high density rock as they are to separate out larger pieces of low density wood. The product still remains a mixture of mineral and wood particles.

Other proposals have involved mechanically separating the larger and smaller materials of log yard waste. The problem with these separation methods is that they are not powered through hydraulic power, so as to reduce power consumption and reduce fire hazards. Also, the prior art does not strategically position dampening fingers, accelerator plates, and dampening plates across multiple conveyors to regulate the speed of the materials. Even though the above cited log yard waste separating systems and methods meets some of the needs of the market, a hydraulic separation system that enables efficient recycling of log yard waste from an elevated frame into fine granules, small rocks, small bark, large bark, and large rocks with a variety of sequentially positioned, hydraulically powered separating components is still desired.

SUMMARY OF THE INVENTION

The Illustrative embodiments of the disclosure are generally directed to a hydraulic separation system and method. In some embodiments, the hydraulic separation system and method enables efficient recycling of log yard waste from an elevated frame. The system separates fine granules, small rocks, small bark, large bark, and large rocks with a variety of sequentially positioned, hydraulically powered separating components. The separation is mechanical and the size and weight of the individual material determines where in the system it is separated.

In some embodiments, multiple conveyors carry the log yard waste throughout the system. The conveyors are arranged in a multi-level configuration to create more efficient distribution of materials. In one embodiment, shaking screens shake in a fast, up and down motion to flip and move the material through the system. Adjustable sloped plates work to accelerate and decelerate the material through the system. Dampening fingers control the disposition of elongated pieces of large bark and help to decelerate down the material. Blowers separate the bark from heavier rock and granular material. The system is supported by an elevated frame that enables cleaning and access to materials that are dropped and blown to areas beneath the elevated frame.

In some embodiments, the system is powered by a hydraulic power system. Various tubes carry a hydraulic fluid in a circuit throughout the system. Various valves regulate flow of the hydraulic fluid. In one embodiment, fourteen motors power the various conveyors and blowers. The system further includes a hydraulic bleed off motor control system and relief valves that regulates flow of hydraulic fluid and releases excess pressure buildup. This creates a safety feature for the system.

In one aspect, a hydraulic log yard waste separation system, comprises:
  a frame, the frame configured to support and elevate the system;
  a hydraulic power system, the hydraulic power system configured to power the system;
  a shaker assembly, the shaker assembly configured to generate a fast up and down motion;
  a feeder conveyor, the feeder conveyor configured to enable discharge of a material;
  a second conveyor, the second conveyor configured to join with the feeder conveyor, the second conveyor further configured to receive the material from the feeder conveyor, the second conveyor further configured to carry the material;
  a disbursement pad, the disbursement pad configured to join with the second conveyor, the disbursement pad further configured to receive the material from the second conveyor, the disbursement pad configured to operatively connect to the shaker assembly, the disbursement pad further configured to shake in a fast, up and down motion;
  an upper shaking screen, the upper shaking screen configured to join with the disbursement pad, the upper shaking screen defined by a plurality of upper openings configured to enable at least partial passage of a portion of the material, the upper shaking screen configured to operatively connect to the shaker assembly, the upper shaking screen further configured to shake in a fast, up and down motion;
  an accelerator plate, the accelerator plate configured to receive the material from the plurality of the shaking screen, the accelerator plate further configured to have an adjustable accelerating slope, the adjustable accelerating slope configured to enable the accelerator plate to increase the velocity of the material;
  a plurality of dampening fingers, the plurality of dampening fingers configured to join with the accelerator plate, the plurality of dampening fingers further configured to orient the material;
  a decelerator plate, the decelerator plate configured to join with the accelerator plate, the decelerator plate further configured to receive the material from the accelerator plate, the decelerator plate further configured to have an adjustable decelerating slope, the adjustable decelerating slope configured to enable the decelerator plate to decrease the velocity of the material;
  a third conveyor, the third conveyor configured to receive the material from the decelerator plate;
  a first blower, the first blower disposed proximally to the third conveyor, the first blower configured to force air towards the material as it comes off of the third conveyor;
  a reverse fourth conveyor, the reverse fourth conveyor configured to receive the material from the third conveyor;
  a slide, the slide configured to receive the material from the reverse fourth conveyor;
  a fifth conveyor, the fifth conveyor configured to receive the material from the slide;
  a first divider plate, the first divider plate configured to join the fifth conveyor, the first divider plate further configured to separate the material between a first back section and a first front section;
  a second blower, the second blower disposed proximally to the fifth conveyor, the second blower configured to force air towards the material as it comes off of the fifth conveyor, the second blower further configured to force a portion of the material from the fifth conveyor to the first divider plate;
  a lower shaking screen, the lower shaking screen configured to receive a portion of the material passing through the upper shaking screen, the lower shaking screen defined by a plurality of lower openings configured to enable at least partial passage of a portion of the material, the lower shaking screen further configured to operatively connect to the shaker assembly, the lower shaking screen further configured to shake in a fast, up and down motion;
  a sixth conveyor, the sixth conveyor configured to receive the material from the lower shaking screen;
  a third blower, the third blower disposed proximally to the sixth conveyor, the third blower configured to force air towards the material as it comes off of the sixth conveyor, the third blower further configured to force a portion of the material from the sixth conveyor to the fifth conveyor and the seventh conveyor;
  a second divider plate, the second divider plate configured to join the sixth conveyor, the second divider further configured to receive a portion of the material from the sixth conveyor, the second divider plate further configured to separate the material between a second back section and a second front section;
  a fourth blower, the fourth blower disposed proximally to the third divider plate, the fourth blower configured to force air towards the material as it comes off of the seventh conveyor, the fourth blower further configured to force a portion of the material from the seventh conveyor to the third divider plate;
  an eighth conveyor, the eighth conveyor configured to receive a portion of the material passing through the lower shaking screen; and
  a ninth conveyor, the ninth conveyor configured to receive the material from the eighth conveyor, the ninth conveyor further configured to discharge a portion of the material from the system.

In another aspect, the material is log yard waste consisting of large rocks, large bark, small rocks, small bark, and fine granules.

In another aspect, the large rocks have a diameter of at least 2 inches.

In another aspect, the large bark is at least 2 inches long.

In another aspect, the small rocks have a diameter between ¾ inches and 2 inches.

In another aspect, the fine granules have a diameter less than ¾ inches.

In another aspect, the frame rests on a cement base having dimensions of about 8'×16'.

In another aspect, the first conveyor is a feed conveyor with sloped sides to aid controlled disbursement.

In another aspect, the sixth conveyor is a belt having a width between 10" and 12" inches wide In another aspect, the shaker assembly is sloped at about a 24° to 30° angle.

In another aspect, the shaker assembly shakes at about 3½ times per second.

In another aspect, the reverse fourth conveyor is sloped at about a 17 to 26 degree angle.

In another aspect, the divider plates are laterally and vertically adjustable.

One objective of the present invention, is to provide a log yard waste separation system that separates large and smaller materials in an efficient manner.

Another objective is to provide a hydraulic system to power the log yard separation system.

Another objective is to provide an elevated frame to enable cleaning and access to materials discharged beneath the elevated frame.

Yet another objective is to provide dampening fingers, accelerator plates, and dampening plates to regulate the speed of the material.

Yet another objective is to provide multiple layers of conveyors that work together to carry log yard waste materials.

Yet another objective is to provide blowers to carry lighter materials.

Another objective is to provide multiple conveyors for carrying the variously sized and weighted materials.

Another objective is to reduce fire hazard through use of a hydraulic system to power the conveyors, motors, and blowers.

Another objective is to reduce fire hazards by elevating the system on an elevated frame.

Another objective is to reduce the cost and waste involved in separating log yard waste by separating smaller granules from larger rocks and bark.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A hydraulic log yard waste separation system 100 and method 200 is referenced in FIGS. 1-14C. The hydraulic log yard waste separation system 100, hereafter, "system 100", allows for efficient recycling and reclaiming of log yard waste material. In some embodiments, the system 100 is configured to separate the aggregate of the log yard waste material into distinct materials having individual characteristics and recycling value, such as fine granules, small rocks, small bark, large bark, and large rocks. Once separated, these individual materials may be recycled, reconstituted, or disposed of in a more efficient manner. The system 100 utilizes a hydraulic power system 124 and leverages gravity to power the separation components and to convey the materials to the various separation components.

Figure 1:
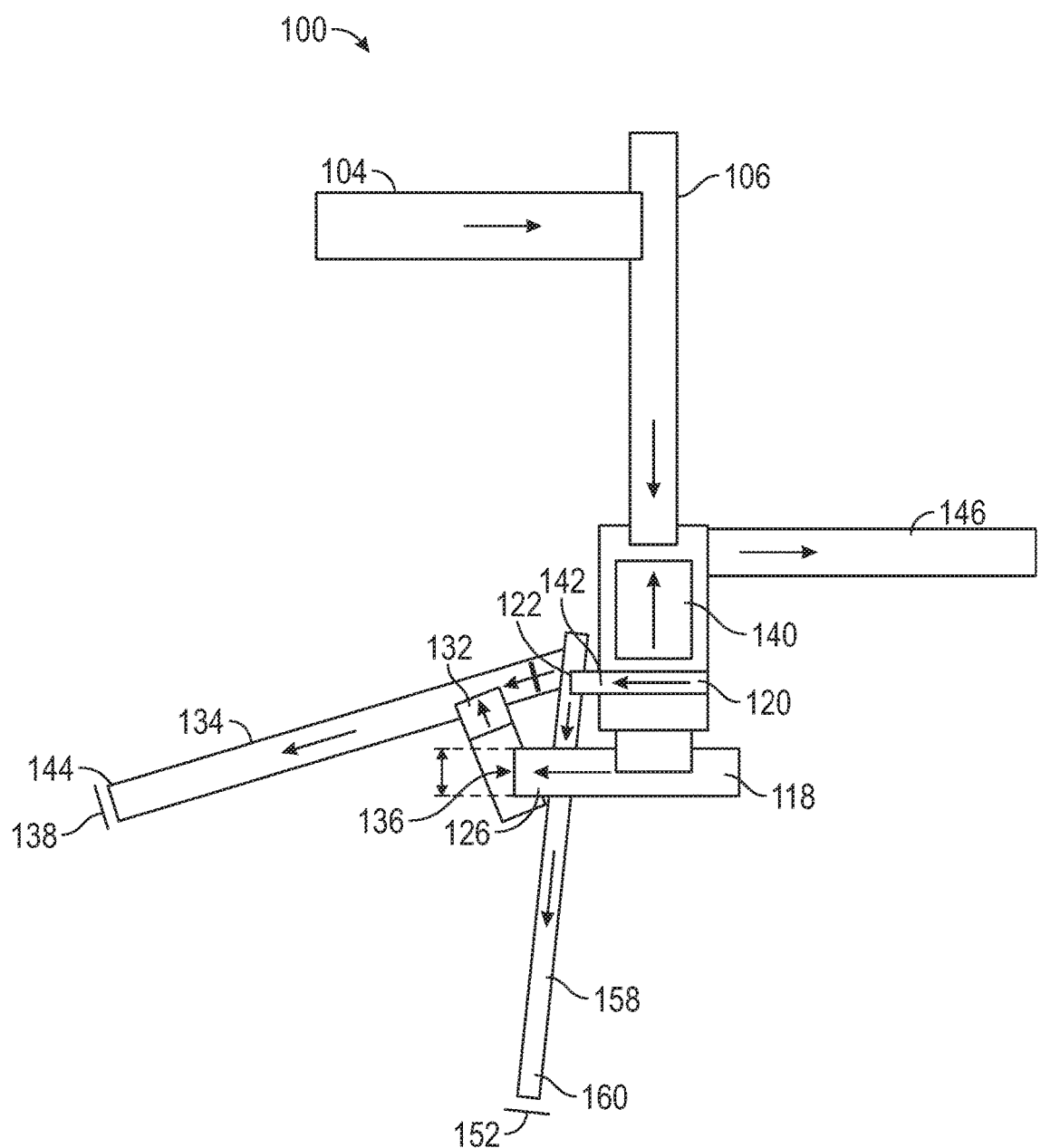
FIG. 1 illustrates a schematic diagram of an exemplary hydraulic log yard waste separation system, in accordance with an embodiment of the present invention.

As referenced in FIG. 1, the system 100 provides dedicated separating components that mechanically segregate the materials, chiefly based on the size, weight, and density of individual materials. As the aggregate material passes through a separating component, a portion of the material is separated. The remaining materials continue through the system 100 until they are subsequently separated by additional separating components. In one embodiments, the separation components provide the mechanical functions of: belt conveyance, shaking, filtering, dividing, and blowing air.

In some embodiments, the system 100 may provide an automated, efficient mechanism to recycle and reclaim log yard waste material by separating the aggregate material consisting of at least: fine granules, small rocks, small bark, large bark, and large rocks. The large rocks have a diameter of at least 2". Once separated out, the large rocks may be used for log yard road base. The large bark may include wood bark peeled form a tree during processing, and be at least 2" long. Those skilled in the art will recognize that the large bark can be used for hog fuel.

The small rocks have a diameter between ¾" and 2". The fine granules may include rocks and sand having a diameter less than ¾". Once separated out, the fine granules may be used for the formation of gardening soil. Generally, the bark is substantially lighter than the rocks. Once separated, these materials may be recycled, reconstituted, or disposed of in a more efficient manner.

In some embodiments, the system 100 is powered by a hydraulic power system 124. Various tubes carry a hydraulic fluid in a circuit throughout the system. Various valves regulate flow of the hydraulic fluid. In one embodiment, fourteen motors power the various conveyors and blowers. The system 100 further includes a hydraulic bleed off motor control system and relief valves 184 that regulates flow of hydraulic fluid and releases excess pressure buildup. This capacity to bleed off excess hydraulic fluid pressure creates a safety feature for the system 100.

Figure 2:
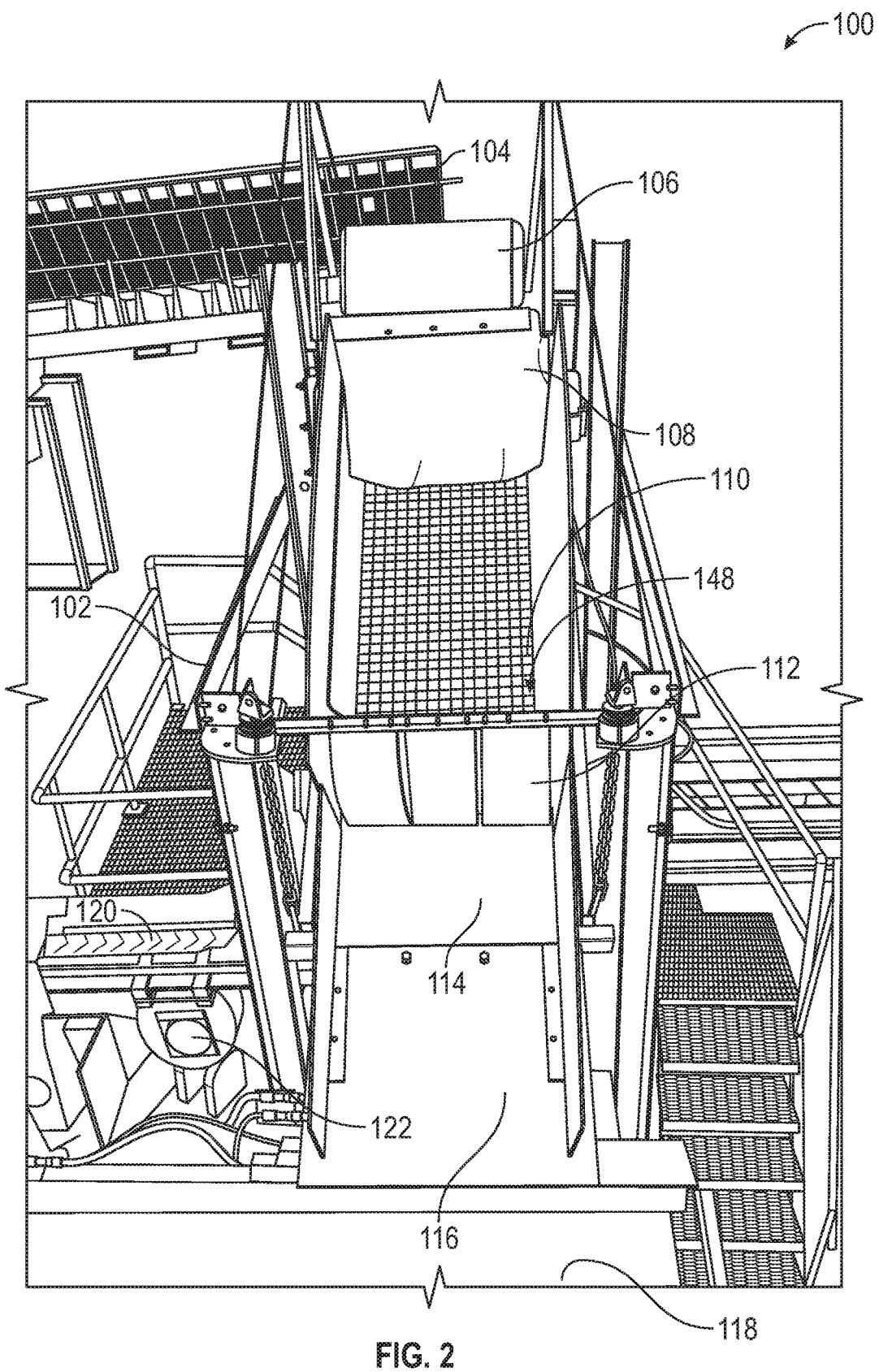
FIG. 2 illustrates a perspective view of an exemplary hydraulic log yard waste separation system, in accordance with an embodiment of the present invention.

As referenced in FIG. 2, the system 100 rests on an elevated frame 102. The frame 102 forms the structural support for the separating components in the system 100. In one embodiment, a series of chains and springs integrated into the frame 102 create a dampening effect, such that the frame 102 can absorb forces and movement by the different components. The frame 102 rests on a base having dimensions of about 8'×16'. In some embodiments, the frame 102 may be height adjustable to provide greater space for piling the large rocks and fine granules on the ground. Suitable materials for the frame 102 may include, without limitation, steel, iron, aluminum, metal alloys, and wood.

Figure 3:
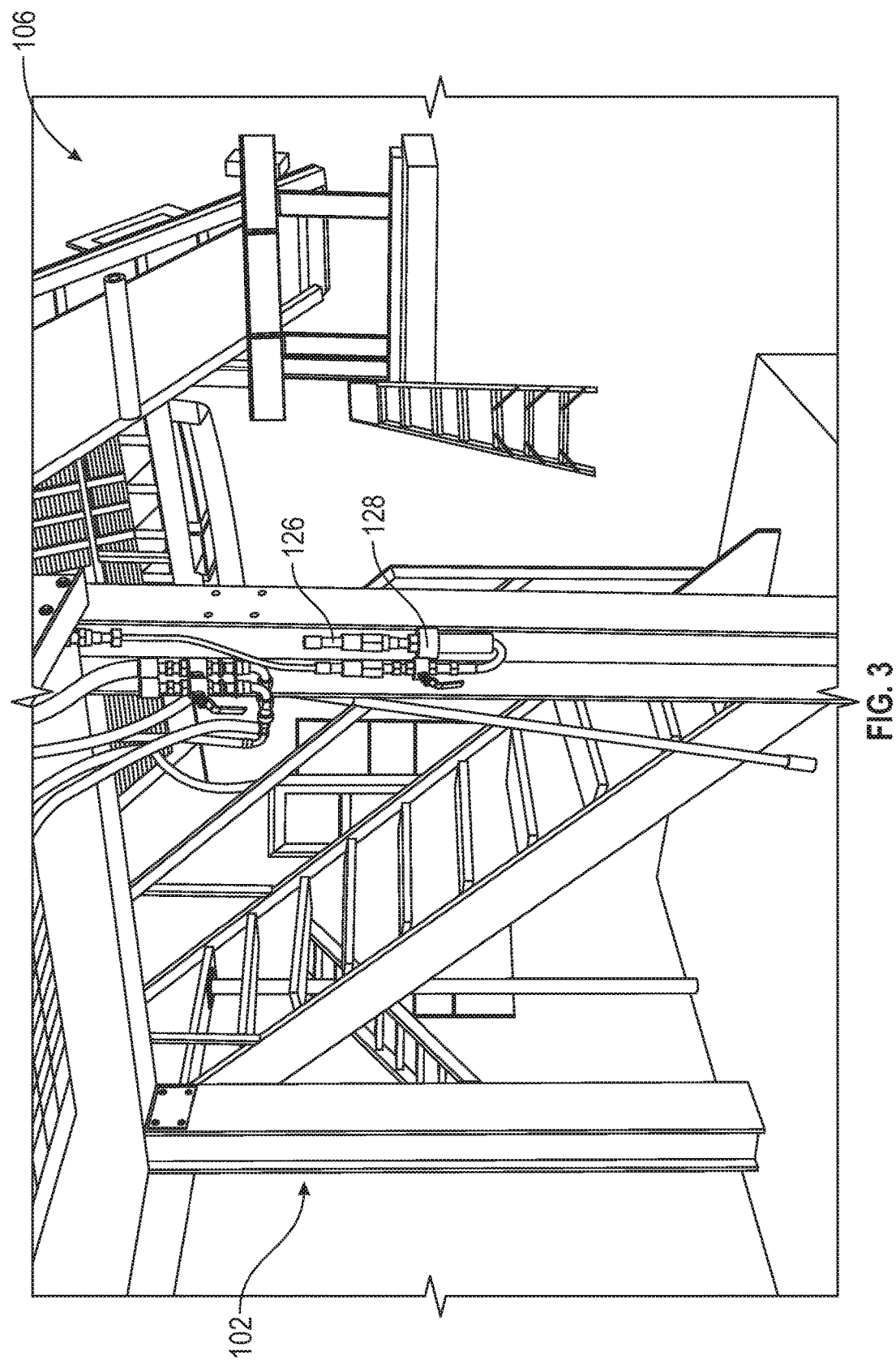
FIG. 3 illustrates a perspective view of an exemplary frame elevating the hydraulic log yard waste separation system, in accordance with an embodiment of the present invention.

As illustrated in FIG. 3, the raised disposition of the frame 102 facilitates removal of large rocks for reclaiming, and also leverages the effects of gravity to carry the log yard waste material through the system 100. Those skilled in the art will recognize that as large piles of log yard waste decompose, heat is produced. This heat may ignite and start a fire. For example, a fourteen foot high pile, after a year can heat up to 120-250° Fahrenheit. It is significant to note, however, that the heat problem is from the original pile of log yard waste that has been piled and stored by the mill. Though this is not from the separation process.

The system 100 utilizes a shaker assembly to generate shaking motion that is then transferred to various screens and plates. The shaker assembly is integrated into the frame 102, so as to operatively connect to multiple separating components simultaneously. The shaker assembly is unique in that it shakes quickly in an up and down disposition; for example at about 3½ times per second. This up-and-down motion breaks up aggregate materials and clumped material more efficiently and also serves to shake the material to enable facilitated movement across the various screens and conveyors. In one possible embodiment, the shaker assembly is sloped at about a 24° to 30° angle.

Figure 4:
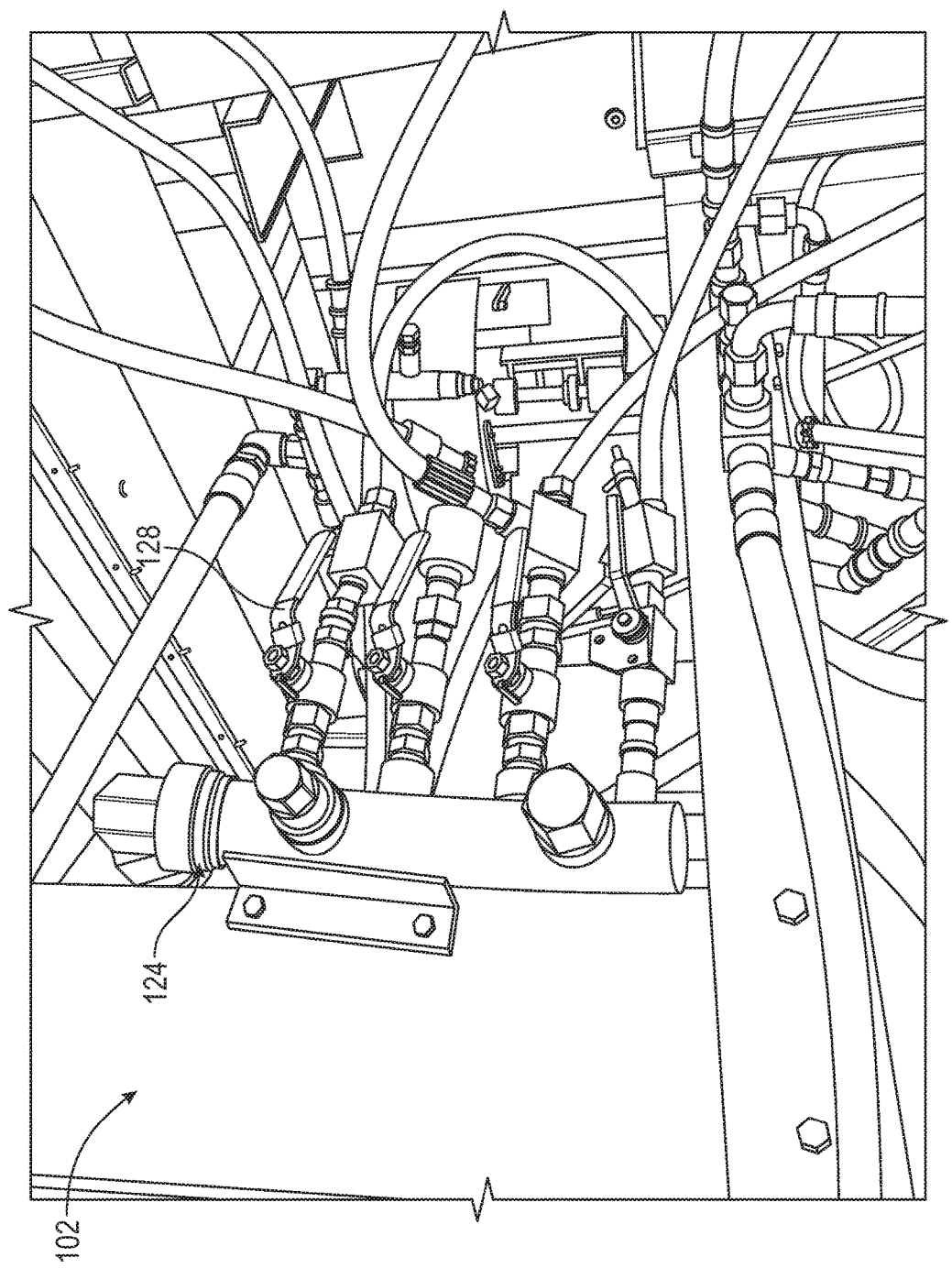
FIG. 4 illustrates a close up view of an exemplary hydraulic valve system, in accordance with an embodiment of the present invention.

Looking now at FIG. 4, a hydraulic power system 124 serves to force hydraulic fluid to actuate the separating components of the system 100. The hydraulic power system 124 utilizes fluids, such as hydraulic oil, to run hydraulic pumps and motors associated with each separating component. A plurality of valves 128 regulates passage of the hydraulic fluids to the appropriate separating component.

Figure 5:
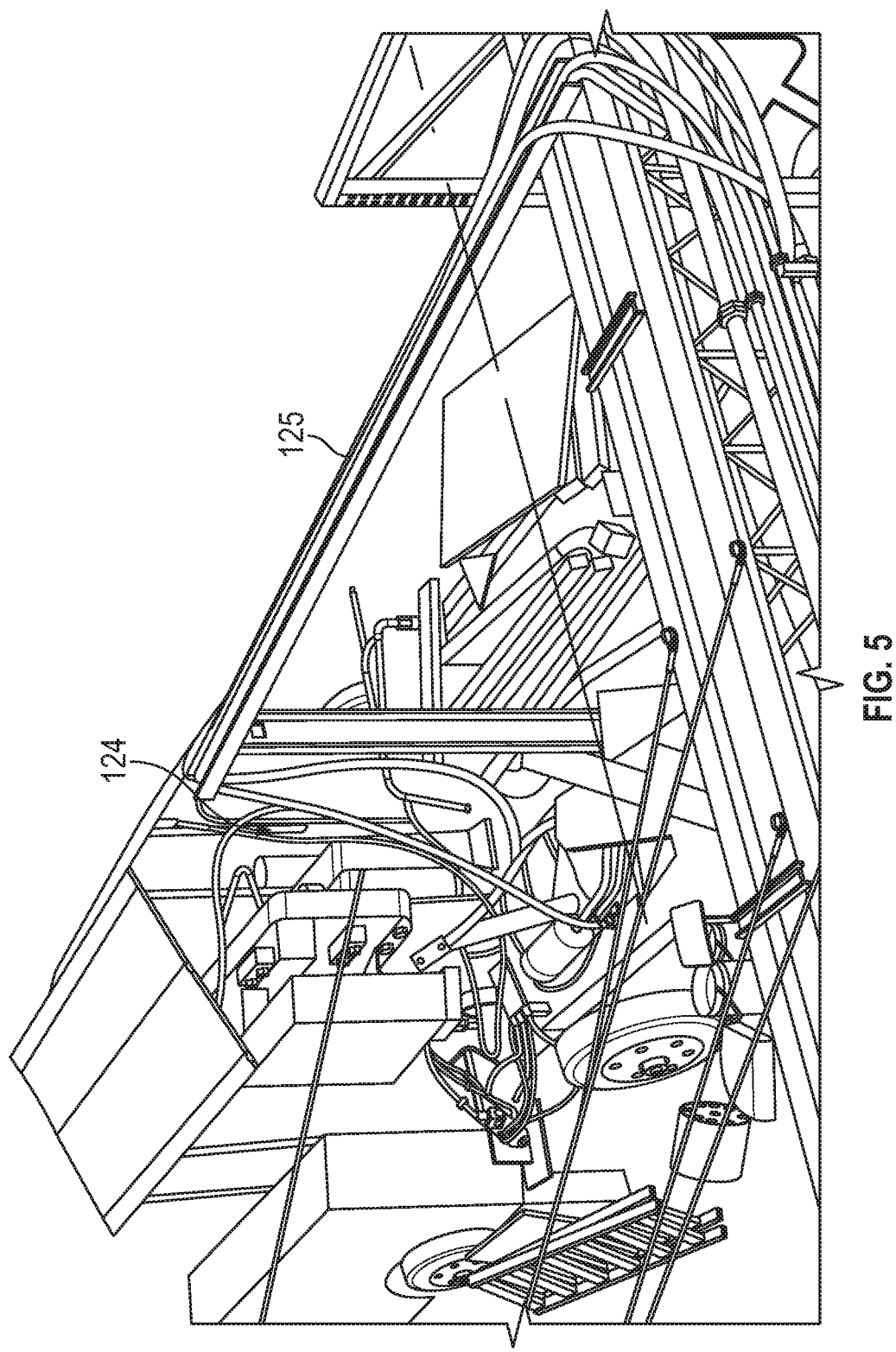
FIG. 5 illustrates a perspective view of an exemplary hydraulic power unit and an exemplary hydraulic tube tray carrying hydraulic hoses, in accordance with an embodiment of the present invention.

A hydraulic tube tray 125, illustrated in FIG. 5, carries the various hydraulic hoses to the different separating components. FIG. 5 also illustrates hydraulic hoses feeding the motors that run the conveyors. In some embodiments, the hydraulics power system 124 comprises three hydraulic pumps, comprising: two fixed displacement pumps and a variable displacement pump.

One fixed displacement pump operates the shaker assembly. The other displacement pump and the variable displacement pump generate flow and constant pressure of hydraulic fluid at 1,000 PSI to operate at least fourteen separating components in the system 100. It is significant to note that if any one of the separating components becomes inoperable, a remote or radio control worn by all employees can be used to shut down the entire system 124. In one alternative embodiment a diesel engine is used to power system 124 and a 12 volt direct current is used to control the hydraulic power system 124.

Figure 6:
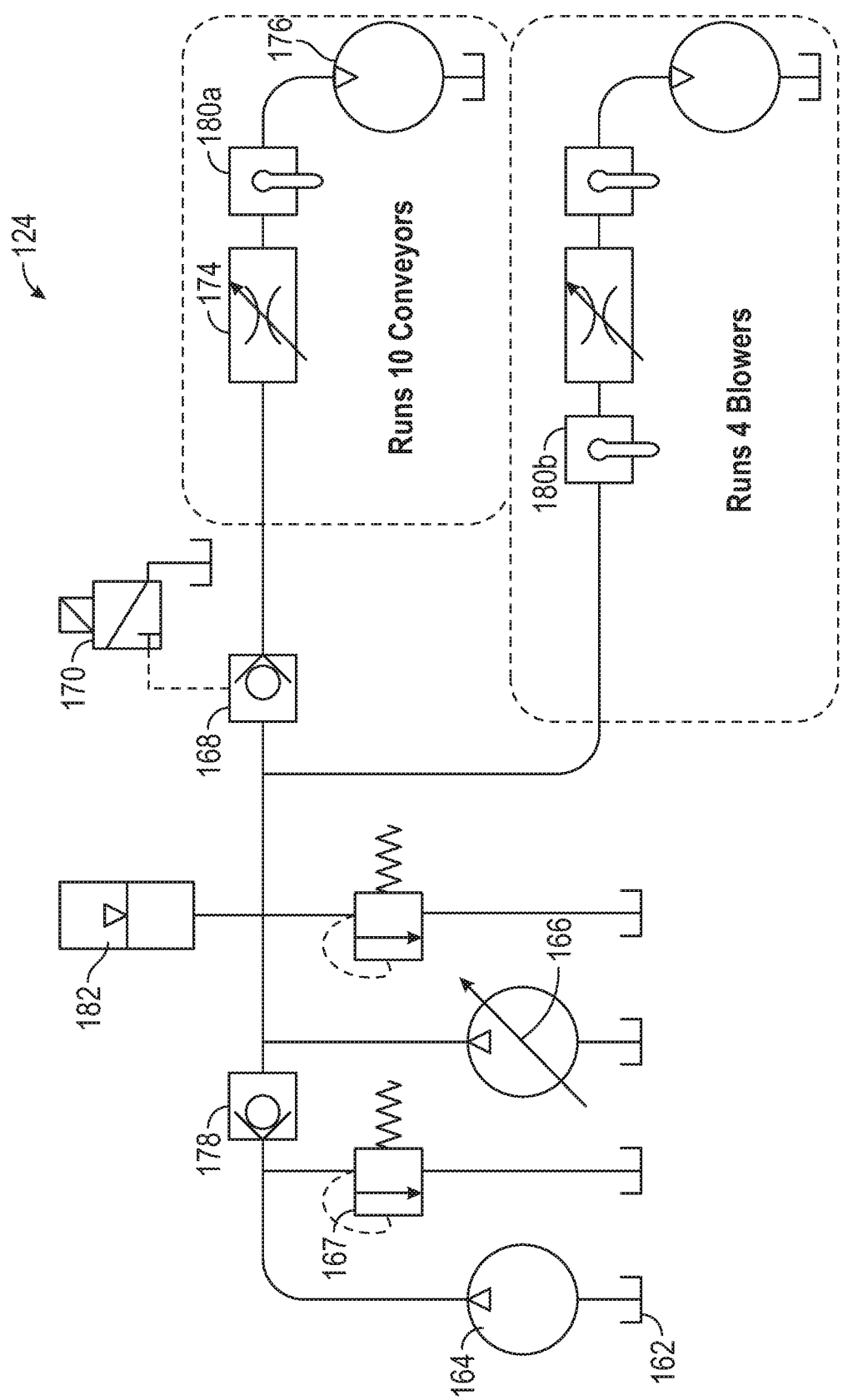
FIG. 6 illustrates a schematic diagram of an exemplary constant pressure hydraulic system, in accordance with an embodiment of the present invention.

FIG. 6 illustrates the constant pressure hydraulic system 124. The system 124 circulates hydraulic fluid, such as oil, from a hydraulic reservoir 162 throughout the system 124. In this manner, the system 124 operates and powers at least fourteen motors 176 with a constant supply of hydraulic fluid. In one embodiment, the fourteen motors 176 may include a geroter and vane motors. In another embodiment, fourteen motors are controlled by the hydraulic system 124 at about 1,000 PSI. The system 124 is a constant pressure system, which may be preset at 1000 PSI.

In another embodiment, the hydraulic system 124 forms a unique circuit that operates ten conveyors and four blowers with a fixed displacement vane pump 164 and a variable displacement vane pump 166. As discussed above, the pumps 164, and 166 produce the oil flow to run the fourteen motors 176. Though in some embodiments, more or less motors could be operated, depending on oil flow. The motors are controlled by a pressure compensated flow control 174 that can vary between 0-25 GPM. This allows for adjustment of the motor speed. The system 124 may also include at least one ball valve 180*a* and one flow control 174 per motor, ball valve 180*b* is used to manually shut off all blower circuits. This allows for facilitated maintenance, adjustments, and emergency shut off.

In some embodiments, pilot pressure and electric solenoids control the flow of hydraulic fluid to the various conveyors and blowers. In one embodiment, a vented relief valve 167 on the fixed displacement pump 164 is vented to the hydraulic reservoir 162. At the same time variable displacement pump 166 forces the hydraulic fluid towards a check valve 178, which is closed, and towards a pilot operated check 168 and to ball valve 180b. Ball valve 180b is closed. The variable displacement pump 166 also forces the hydraulic fluid towards an accumulator 182, which is pre charged to 1000 PSI. The variable displacement vane pump 166 is pressure compensating @ 1000 PSI and the flow is minimal (½ gallon per minute) when the pump 166 is in standby mode. When the open ball valve 180b enables passage of hydraulic fluid, all the blowers run, but the conveyors do not because the pilot operated check valve 168 is closed.

In some embodiments, radio controls may be used to energize an electronic solenoid valve 170 and 194. The energized electronic solenoid valves 170 sends the hydraulic fluid to the pilot operated check valve 168 and opens it, and electric solenoid valve 194 sends hydraulic fluid to pilot operated check valve 192 and opens it. The pilot pressure opens check valve 168 which supplies oil to the conveyor circuits. The blowers are always running when the power unit is running, but can be shut off with ball valve 180b, for maintenance and safety. All operators where radio controls to be able to start and stop all conveyors and the shaker drive motor. This is accomplished by using two pilot operated check valves. In one embodiment, the engine or power unit can be stopped by manually pulling a cable that is positioned around the plant. In another embodiment, a Murphey version of the system 124 powers off the power unit if there is problem with the hydraulics or engine, i.e., low oil level, running hot, filters plugging, etc.

It is significant to note that simple electrical controls (12 volt DC) and radio controls, relays, and coils are used in the hydraulic system 124. The hydraulics run at low pressure (1000 PSI); though the hydraulics will stop if there is material, such as a rock creating mechanical problems to the conveyors. Furthermore, the hydraulic line size is important for fluid velocity. Line sizes known in the art may be used.

Figure 7:
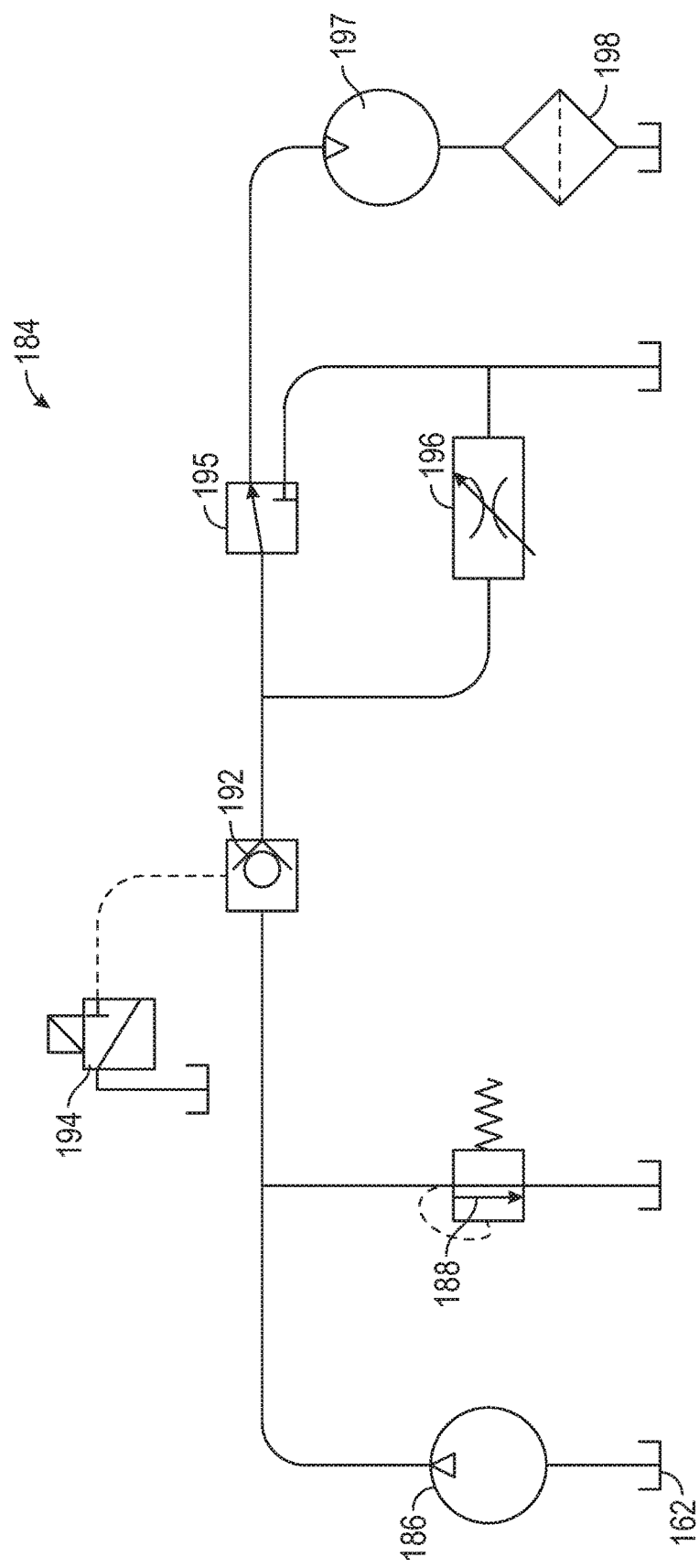
FIG. 7 illustrates a schematic diagram of an exemplary hydraulic bleed off motor control system, in accordance with an embodiment of the present invention.
Figure 8:
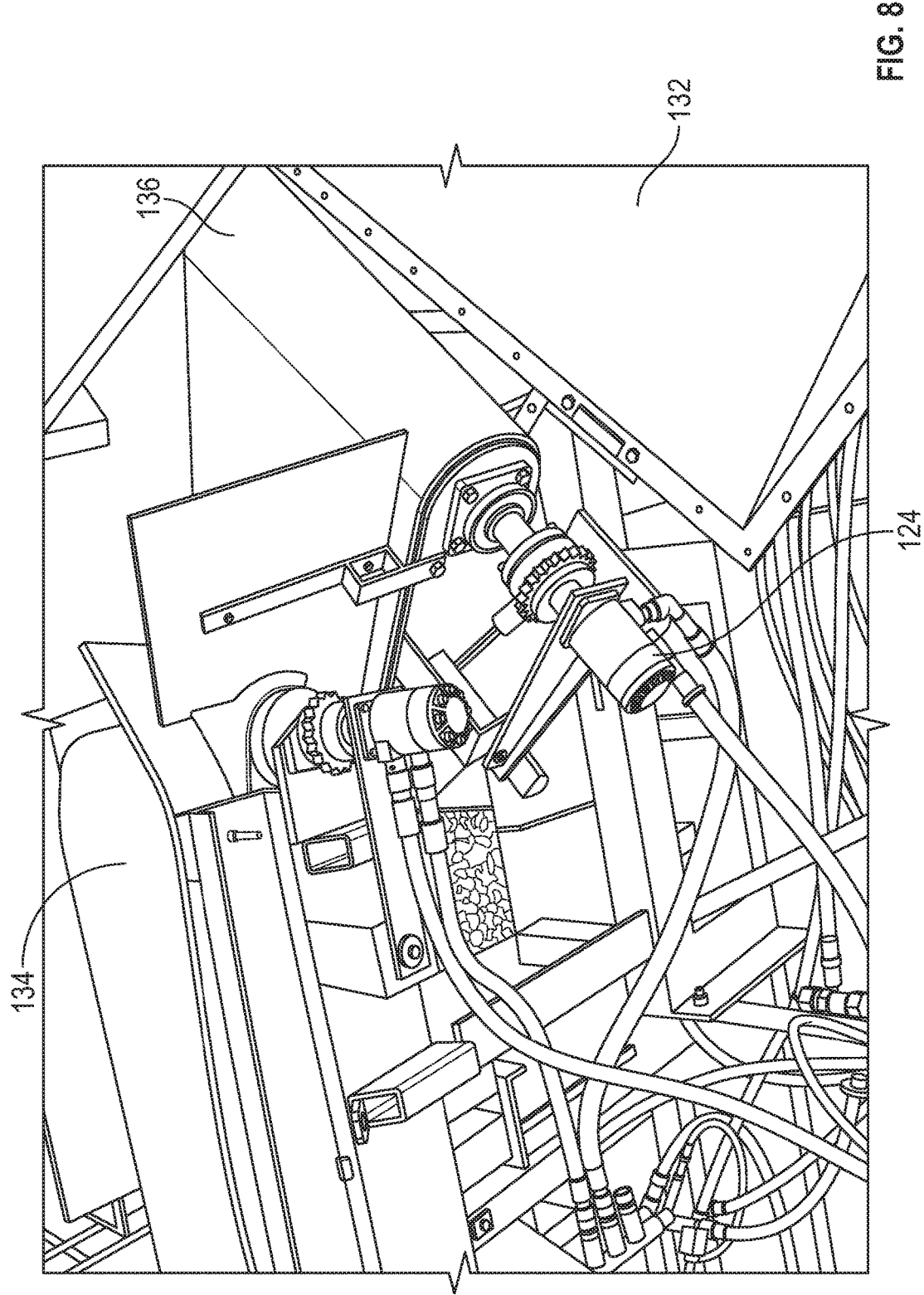
FIG. 8 illustrates a perspective view of an exemplary-third conveyor carrying material to an exemplary reverse fourth conveyor, in accordance with an embodiment of the present invention.

FIG. 7 illustrates a schematic diagram of an exemplary hydraulic bleed off motor control system 184. The hydraulic bleed off motor control system 184 is configured to regulate flow of hydraulic fluid, such as oil. The hydraulic bleed off motor control system 184 also releases excessive pressure buildup from the hydraulic fluid. In one embodiment, the hydraulic bleed off motor control system 184 includes a fixed displacement vane pump 186 that pumps oil through a vented relief valve 188 to a hydraulic reservoir 162. This circuit is regulated with a normally closed pilot operated check valve 192, which when opened runs the shaker screen.

In one embodiment, the control system 184 is powered on by energizing an electric solenoid valve 194, which opens the piloted operated check valve assembly 192. Another pilot closes the vented relief valve 188. The hydraulic fluid flows into a three way ball valve 195 that regulates flow into a hydraulic motor 197. The hydraulic fluid may then flow through a return filter 198 to the hydraulic reservoir 162.

In some embodiments, the three way ball valve 195 can also direct the hydraulic fluid directly back to the hydraulic reservoir—162 and this shuts off the motor 197 so that the system 100 can be started up without the motor 197 running to be able to do maintenance, check radio controls, and let the system 100 warm up. In some embodiments, when the ball valve 195 is open to the hydraulic motor 197, a pressure compensated flow control 196 can be adjusted from 0-20 GPM, to bleed off excess oil, and to vary the speed of the shaker motor 197.

In this manner, the displacement of the motor 197 can be changed to a desired horse power when driving different sized screen assemblies. This one hydraulic motor 197 drives the shaker unit and provides the movement to move the material off the shaker assembly with the help of inclined slopes and the up and down shaking action. For example: 4" up and down at 3¾ times per second. The shaker is supported on four springs and plastic side guides which allow the movement of the shaker assembly.

Looking back at FIG. 2, the system 100 utilizes a feeder conveyor 104 to feed the material to a second conveyor 106. The second conveyor 106 is the highest point on the system 100, and may have sufficient width and length to carry the unseparated materials to the initial process. The feeder conveyor 104 is powered by the hydraulic system 124 described above. The second conveyor 106 is disposed in series with the feeder conveyor 104 to receive the log yard material.

As shown in FIG. 2, the second conveyor 106 is configured to channel the materials from the feeder conveyor 104 onto a disbursement pad 108. The second conveyor 106 may include a roller that works to propel the material towards the disbursement pad 108 while also breaking aggregate material into individual materials. The disbursement pad 108 is operatively connected to the shaker assembly, and thereby shakes in a fast, up and down motion. This fast, up-and-down type of motion serves to separate larger clumps of material and move the material to the next separating component.

Thus, gravity and the motion from the shaking disbursement pad 108 carry the materials to an upper shaking screen 110. The momentum generated by the disbursement pad 108 allows the small rocks, small bark, and fine granules to fall through the upper shaking screen 110 to a lower shaking screen 148. The large rocks, the large bark, and a portion of the small rocks, which cannot pass through the upper openings of the upper shaking screen 110, continue to traverse the upper shaking screen 110, moving next through a plurality of dampening fingers 112.

As illustrated in FIG. 2, the large rocks and large bark pass through a plurality of dampening fingers 112. The dampening fingers 112 are configured to help control the disposition of elongated pieces of large bark and decelerate the larger material. The dampening fingers 112 maintain the large bark coplanar with the disbursement pad 108 and subsequent separating components. In one embodiment, the dampening fingers 112 include a rubber panel that has slits cut into it. The rubber panel is a few inches long, so as to effectively engage the large bark and large rocks. In one alternative embodiment, the dampening fingers 112 may be attached to the end of all conveyors in the system 100. Though in some embodiments, the dampening fingers 112 operate at the terminus of the upper shaking screen 110, a decelerator plate 116, and a reverse fourth conveyor 136, described below.

After having passed through the dampening fingers 112 at the upper shaking screen 110, the large rocks and large bark pass over an accelerator plate 114. The accelerator plate 114 has a sloped configuration, such that gravity and a generally smooth surface channel the large rocks and large bark forward towards an adjacent decelerator plate 116. The decelerator plate has a smaller slope than the accelerator plate 114; thereby resulting in a reduction in velocity of the large bark. The velocity and momentum of the heavier large rocks is, however, maintained due to their heavier weight.

Figure 9:
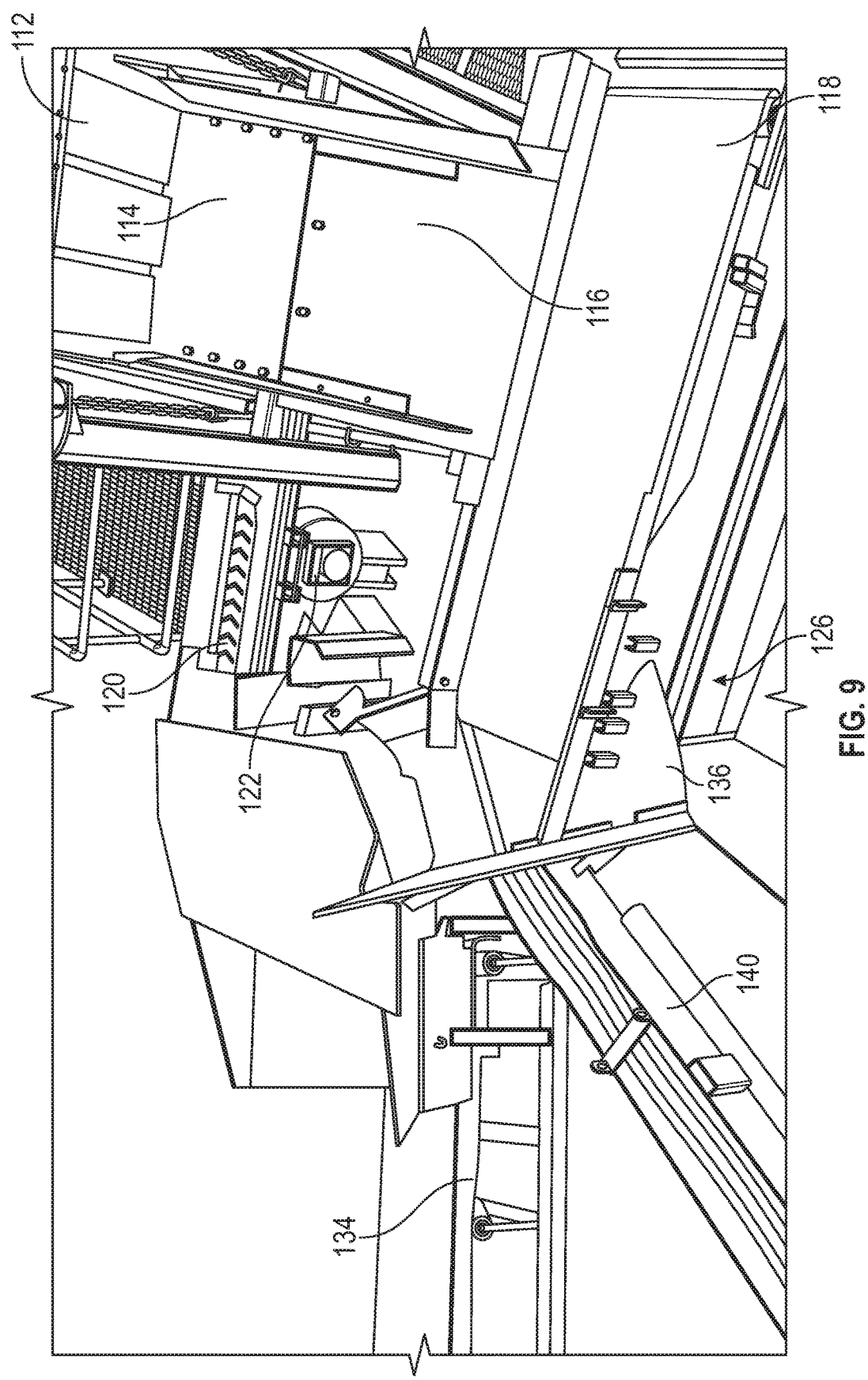
FIG. 9 illustrates a top view of an exemplary third conveyor carrying material to a reverse fourth conveyor and a fifth conveyor, in accordance with an embodiment of the present invention.

As shown in FIG. 9, the decelerator plate 116 terminates at a third conveyor 118 that is disposed generally perpendicular to the decelerator plate 116. The large bark and remaining small rocks, which were slowed down by the decelerator plate 116, terminate their motion at the third conveyor 118. The large rocks, which are heavier than the large bark, and thus less affected by the decelerator plate 116, continue traveling through the third conveyor 118, and cascading off the edge of the third conveyor 118 and to the ground. Because the frame 102 is elevated, the large rocks have sufficient space to form a high pile. From this pile the large rocks may easily be collected; from the general area beneath the third conveyor 118. In one embodiment, the dampening fingers 112 position at decelerator plate 116.

The next separating component is a first blower 126. The first blower 126 is configured to force air across the end of the third conveyor 118. This forced air blows the large bark as it falls off of the end of the third conveyor 118 and onto a reverse fourth conveyor 136. The reverse fourth conveyor 136 is set at an angle so that the heavier rock rolls off of the bottom and the lighter bark stays at the top and then goes to slide 132. In one embodiment, the reverse fourth conveyor 136 is a rubber belt. As discussed above, hydraulics are used to power the reverse fourth conveyor 136 and all the other conveyors.

Figure 10:
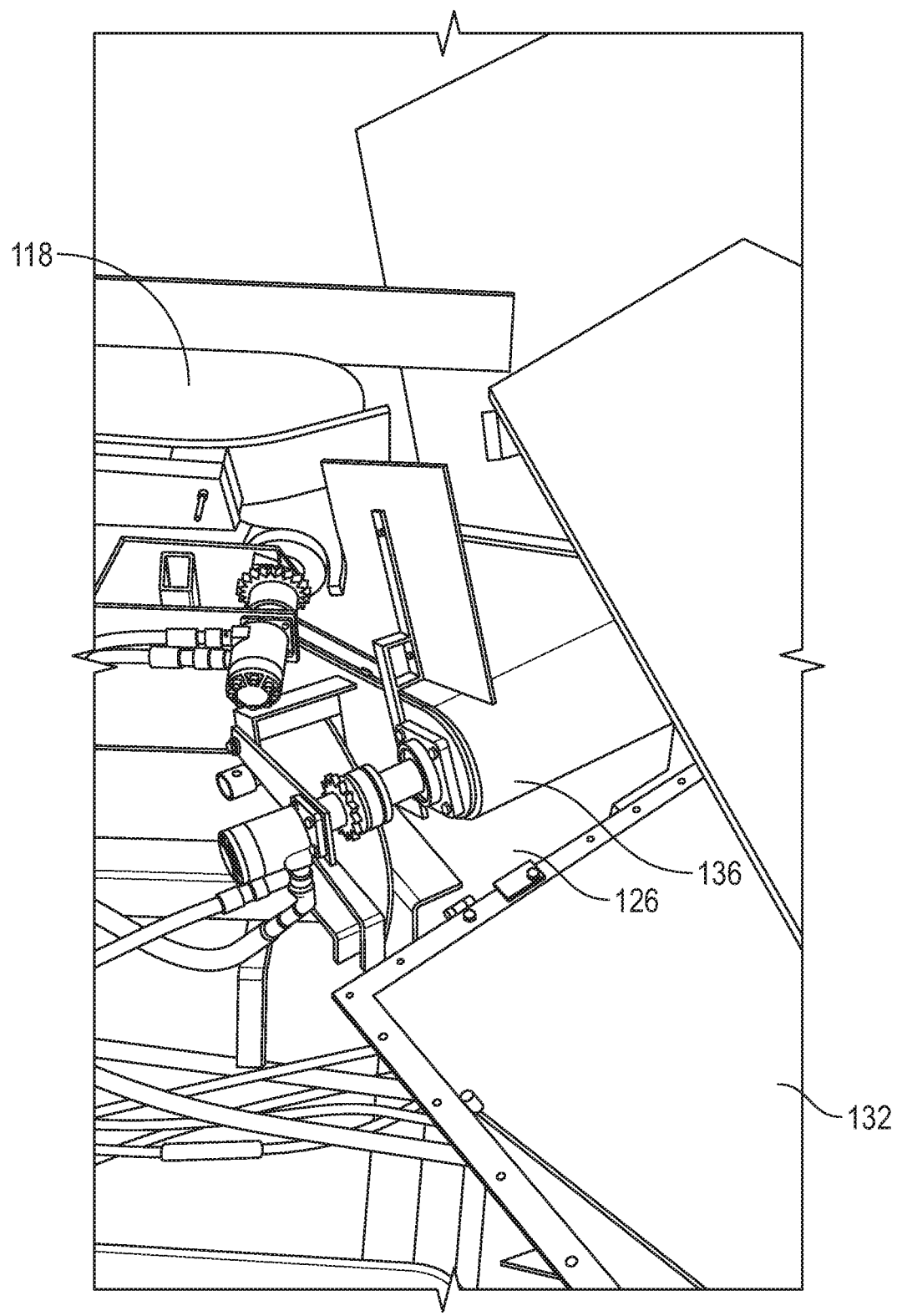
FIG. 10 illustrates a perspective view of a third conveyor conveying material to a reverse fourth conveyor and an exemplary slide, in accordance with an embodiment of the present invention.

Turning now to FIG. 10, the reverse fourth conveyor 136 carries the large bark to a slide 132. The slide 132 is sloped and sufficiently smooth, so to facilitate sliding the large bark and any remaining small rock debris to a fifth conveyor 134. In one embodiment, the dampening fingers 112 position at either termini of the reverse fourth conveyor 136.

Figure 12:
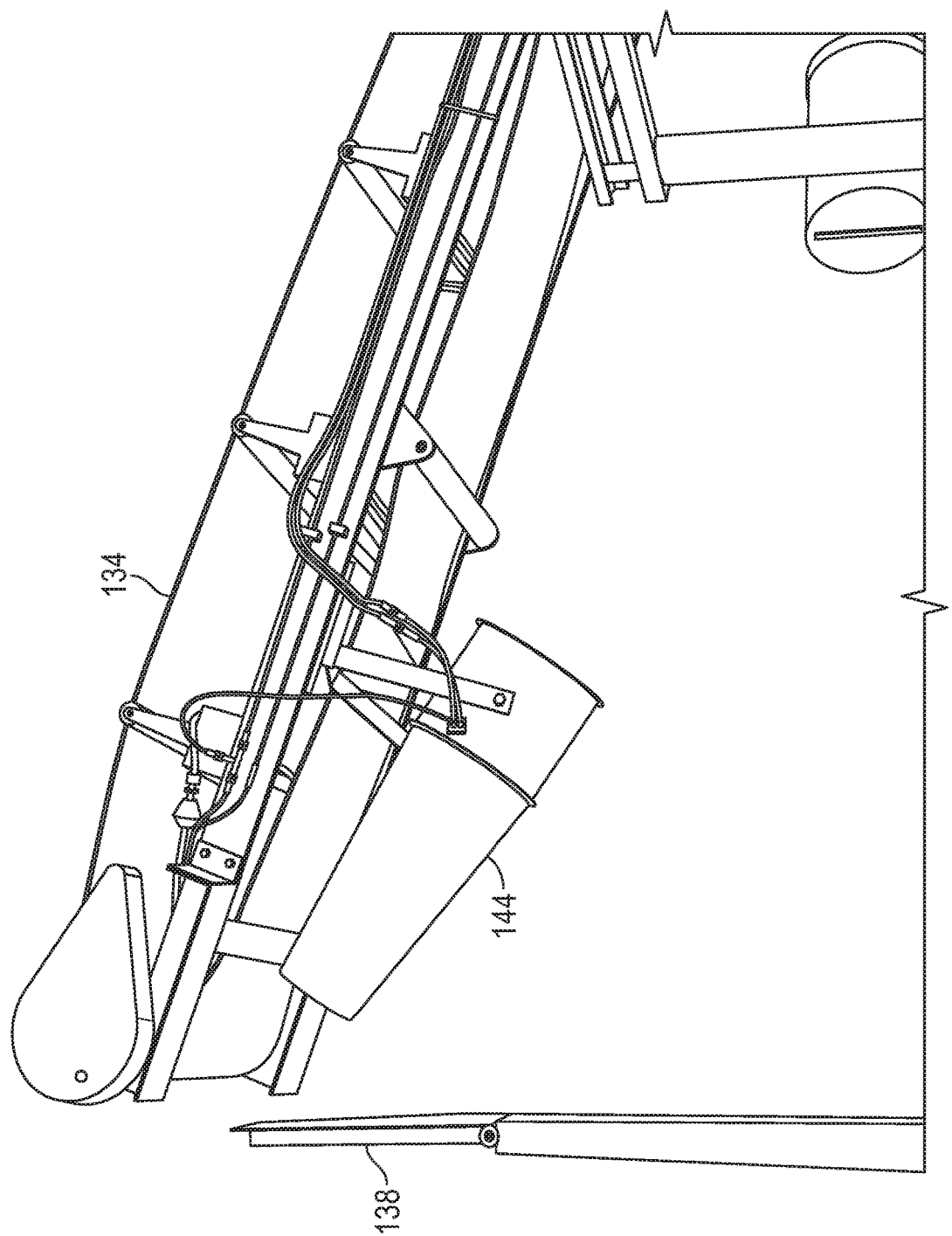
FIG. 12 illustrates a close up view of an exemplary fifth conveyor and a first divider plate, in accordance with an embodiment of the present invention.

FIG. 12 illustrates a perspective view of an exemplary fifth conveyor. The fifth conveyor 134 carries the large bark and any remaining rock debris towards a first divider plate 138. The first divider plate 138 has a first back section and a first front section separated by a barrier. The first divider plate 138 is laterally and vertically adjustable relative to the fifth conveyor 134. In some embodiments, the first divider plate 138 is removable. A second blower 144 positioned at the end of the fifth conveyor 134 forces the large bark to the first back section of the first divider plate 138. The residual rocks and remaining heavier materials remain on the fifth conveyor 134 until the first divider plate 138 segregates them to the first front section.

As discussed above, the upper shaking screen 110 allows the small rocks, small bark, and fine granules to fall through to a lower shaking screen 148. In one embodiment, the lower shaking screen 148 has smaller spaces than the upper shaking screen 110. After falling down to the lower shaking screen 148, the small rocks and small bark are shifted and shaken in a fast, up-and-down motion until they break down and fall to a sixth conveyor 120. The sixth conveyor 120 may travel perpendicularly to the path followed along the second conveyor 106.

Figure 11:
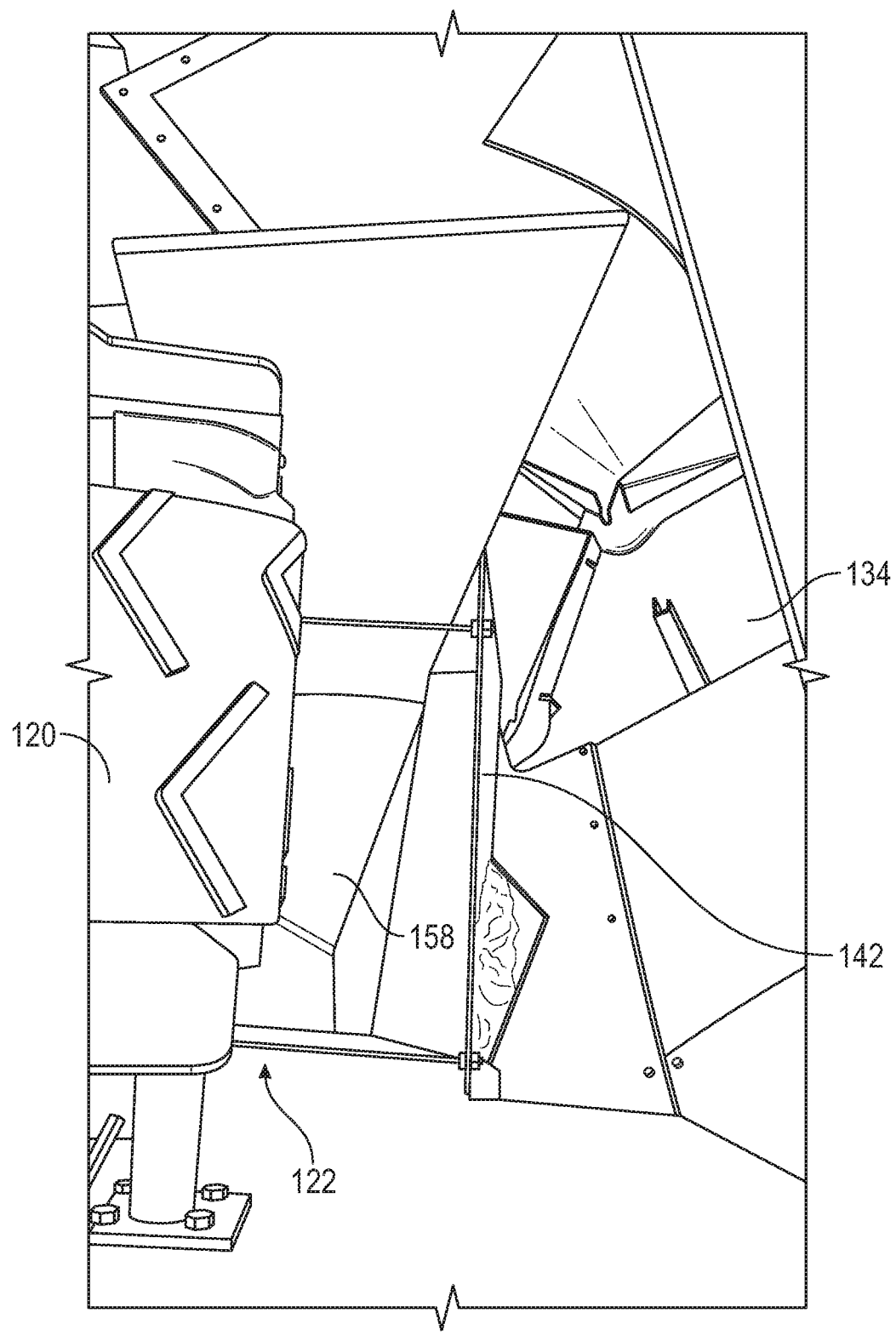
FIG. 11 illustrates a perspective view of an exemplary sixth conveyor and a second divider plate, in accordance with an embodiment of the present invention.

Looking at FIG. 11, as the small rocks and small bark travel along the sixth conveyor 120, a third blower 122 forces air towards the terminus of the sixth conveyor 120. The air from the third blower 122 forces the lightest of the small bark and woody material to the fifth conveyor 134 where they are separated at a second divider plate 142. The second divider plate 142 is laterally and vertically adjustable relative to the sixth conveyor 120. In some embodiments, the second divider plate 142 is removable. The heavier material, i.e., the rocks, fall from the sixth conveyor 120 to the front side of divider plate 142 to the seventh conveyor 158.

In some embodiments, a portion of the log yard waste material is separated at a second divider plate 142. The second divider is configured to receive a portion of the log yard waste material from the sixth conveyor 120. The second divider plate 142 is further configured to separate the log yard waste material between a second back section and a second front section. The system further sends heavier material to a seventh conveyor 158 to fourth blower 160 and third divider plate 152, and also sends lighter material on fifth conveyor 134 to second blower 144 and first divider plate 138. The third divider plate 152 is laterally and vertically adjustable relative to the seventh conveyor 158. In some embodiments, the third divider plate 152 is removable.

In some embodiments, a tenth reverse conveyor 199, positioned under the seventh conveyor 158 can be used to separate the log yard waste, providing a fifth material. This fifth material is clean bark ¾" to 2" that is received from the top of the reverse tenth conveyor 199. The fifth material could be used as decorative clean bark. The other material that would come off the bottom of the reverse tenth conveyor 199 would be ¾ to 2" clean rock.

As FIG. 12 illustrates, the fifth conveyor 134 receives large bark from the slide 132. The fifth conveyor 134 also receives fine bark from the sixth conveyor 120 as it is blown over the second divider plate 142 (See FIG. 1). The combined material travels on the fifth conveyor 134 as it drops off the end it is blown by a second blower 144 past the first divider plate 138. The heavier material falls to the front of the first divider plate 138 and the lighter material is blown to the back of the first divider plate 138.

Furthermore, the fine granules are also separated by the system 100. The fine granules include grains, sand, and small rocks. As discussed above, after the small rocks, small bark, and fine granules are conveyed along the second conveyor 106 and falling through the upper shaking screen 110, the small rocks, small bark, and fine granules fall to a lower shaking screen 148. The fine granules fall through the lower shaking screen 148 onto the eighth conveyor 140. In one alternative embodiment, the fine granules fall through the lower shaking screen 148 and directly onto the eighth conveyor 140.

Figure 13:
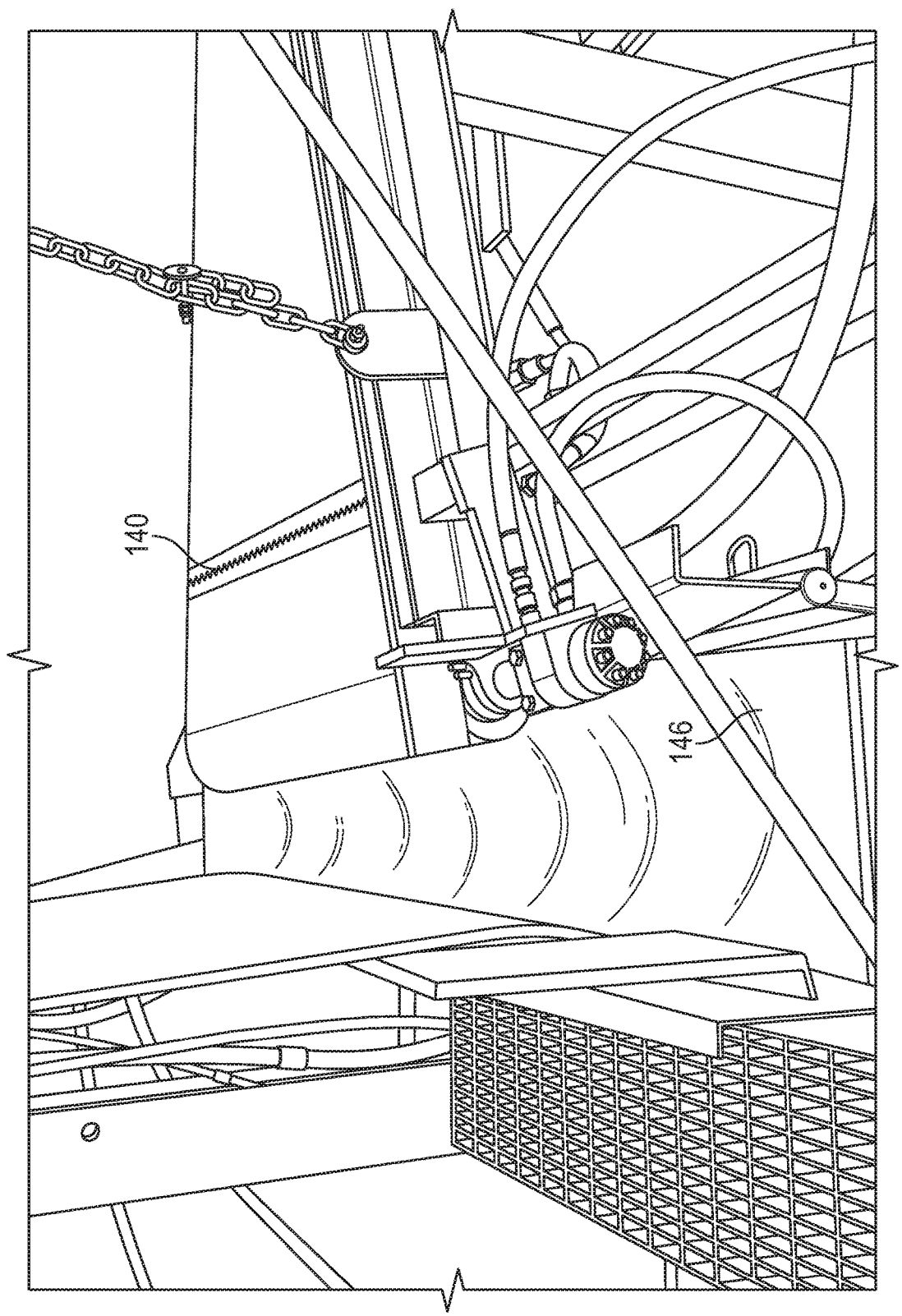
FIG. 13 illustrates a perspective view of an exemplary eighth conveyor carrying material to a ninth conveyor, in accordance with an embodiment of the present invention.

FIG. 13 illustrates a perspective view of an exemplary eighth conveyor 140 carrying material to a ninth conveyor 146. The eighth conveyor 140 carries the fine granules to the ninth conveyor 146 that is generally perpendicularly disposed to the eighth conveyor 140. The ninth conveyor 146, illustrated in FIG. 1, is configured to terminate above the ground, such that the fine granules are piled up beneath the system 100, proximally to the large rocks.

In one possible embodiment for operation of the system 100, a radio control device that emits radio waves, and is commonly used to open and close garage doors may be used. The device then enables remote radio control of the system 100. In some embodiments, a plurality of users, such as employees at a log yard waste site, may wear the radio control device to start and stop the hydraulic system 124, motors 176, and other components remotely.

In one embodiment, when the hydraulic power system 124 is running and in standby mode, the blowers 122, 126, 144, 160 are running, and the pump 166 supplies hydraulic fluid through ball valve, 180b to the four blowers 122, 126, 144, 160. The ball valve 180b can be shut off to turn off blowers 122, 126, 144, 160. When the radio control device is actuated, the electric solenoids 170 and 194, close the relief valve 167 and 188 open two pilot operated check valves 168 and 192 that are normally closed.

In some embodiments, all conveyor and blower motors have pressure compensated flow controls 174 to control the speed. All motors also include at least one ball valve 180a, that enables manual shut down of individual motors for maintenance. Thus, when the system 100 is running the radio control device can start and stop the system 100. The hydraulic fluid vents through the relief valves 167 and 188 to the hydraulic reservoir 162. The pilot operated check valves 168 and 192 close both circuits. If there is a pressure spike the accumulator 182 will absorb oil from pump 166. The following formulas are used to regulate the motor speed of the system:

$$\text{Flow Motor Torque} = \frac{\text{Flow Rate } GPM \times \text{Pressure } PSI \times 36.77}{RPM}$$

When the flow rate is increased it changes the motor speed and increases the motor horsepower.

$$\text{Fluid Motor Torque}/100 \ PSI = \frac{\text{FM Displacement}(CU \ \text{Inches}/Rev)}{0.0628}$$

Thus, low Speed/High Torque Motors are ordered by displacement.

Figure 14A:
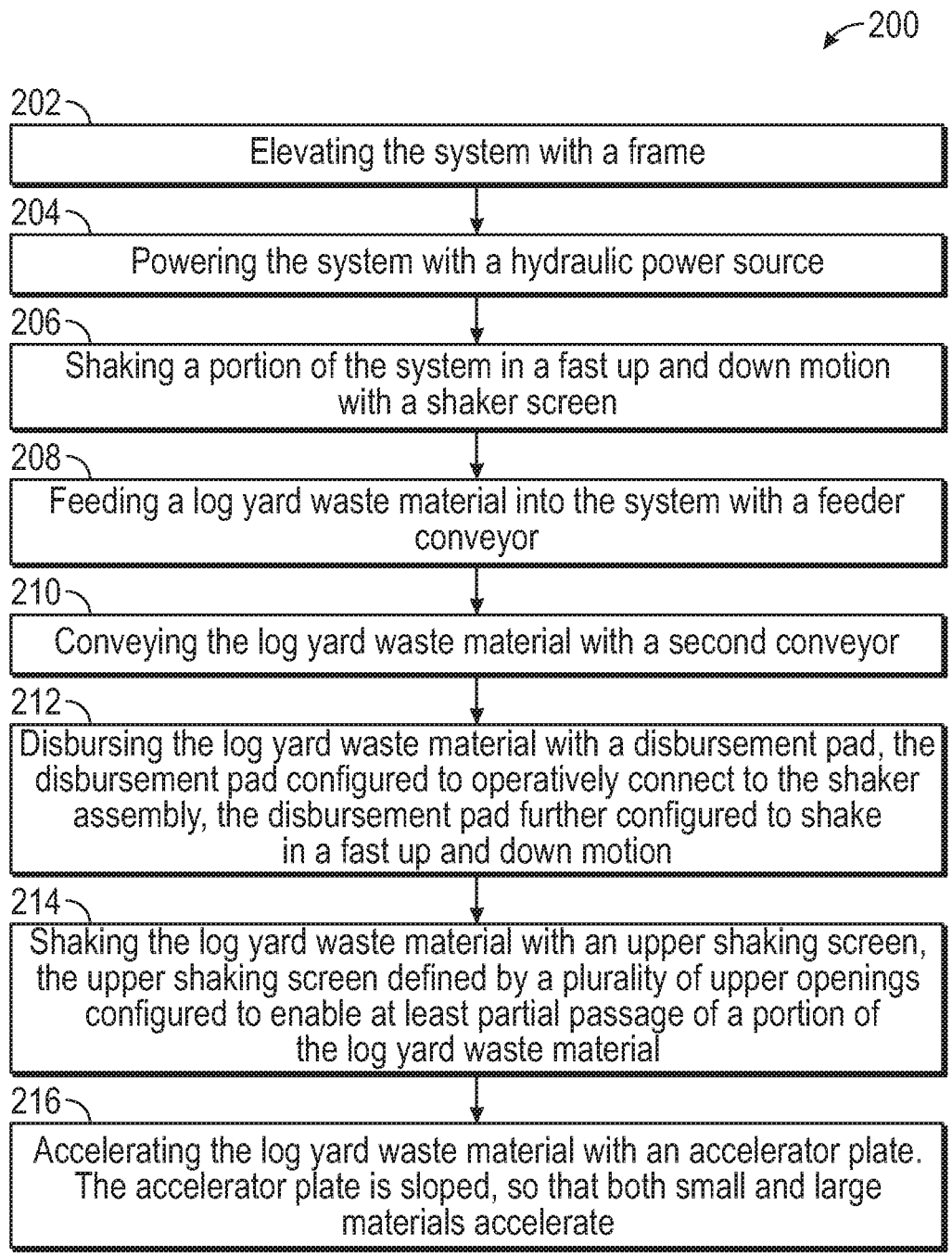
FIGS. 14A, 14B, and 14C illustrate flowchart diagrams of an exemplary method for allowing separating log yard waste material, in accordance with an embodiment of the present invention.
Figure 14B:
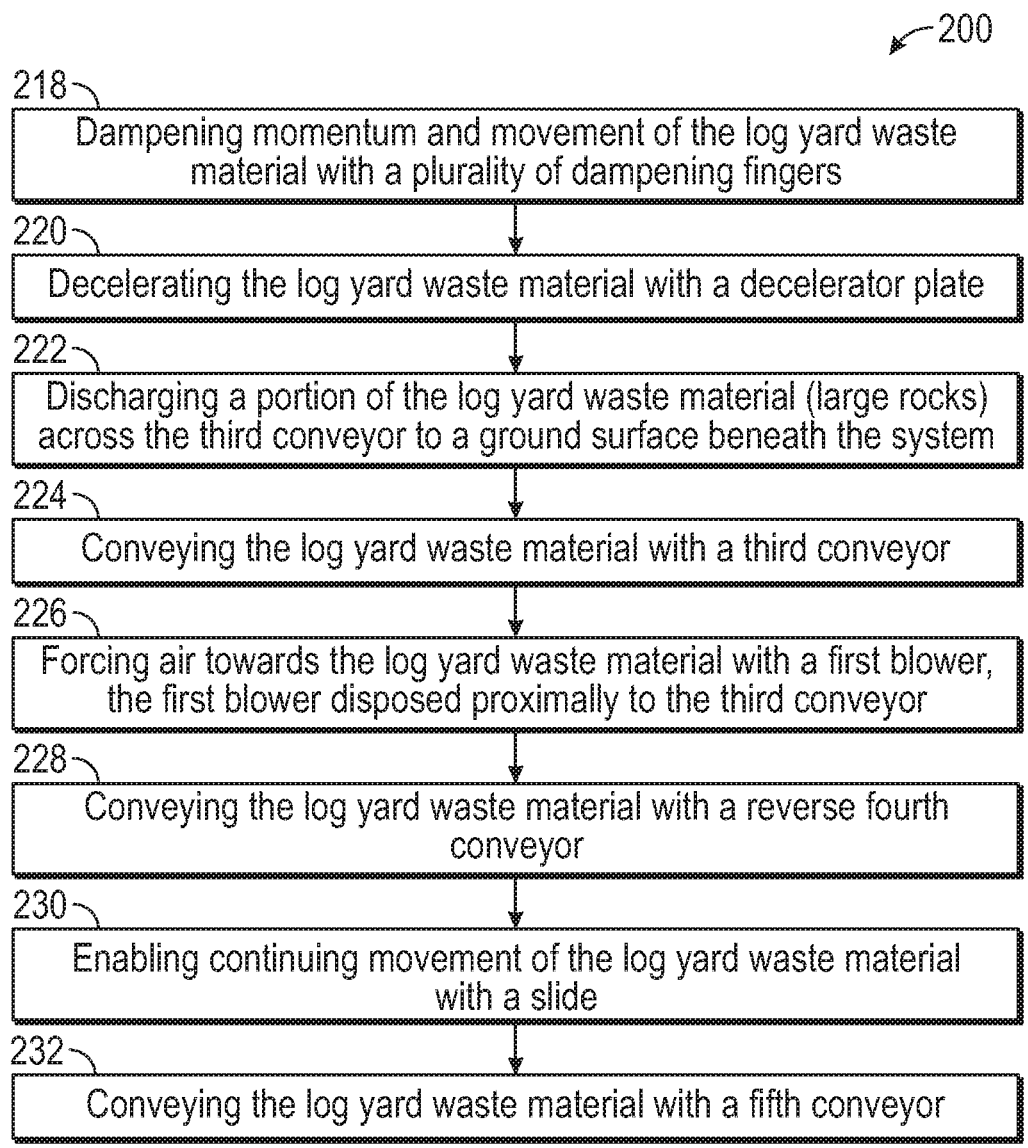
Figure 14C:
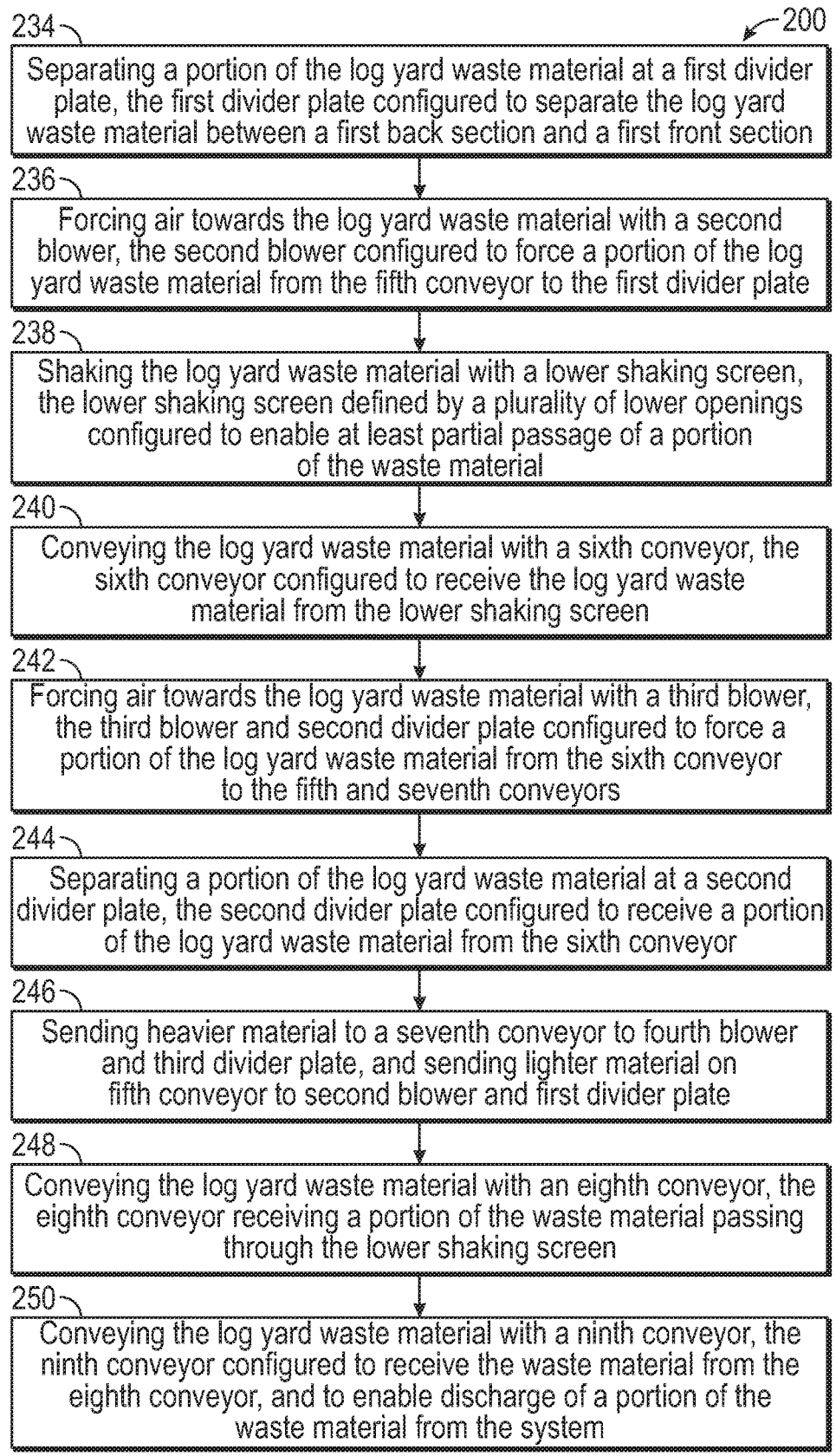

FIGS. 14A, 14B, and 14C illustrate flowchart diagrams of an exemplary method 200 which allows separating log yard waste material. The method 200 provides efficient recycling and reclaiming of log yard waste. The method 200 is configured to separate the aggregate of the log yard waste material into distinct materials having individual value, such as fine granules, small rocks, small bark, large bark, and large rocks. Once separated, these individual materials may be recycled, reconstituted, or disposed of in a more efficient manner. The method 200 also utilizes hydraulics and leverages gravity to carry the materials to the various separation components, and to power the separation components.

The method 200 may include an initial Step 202 of elevating the system 100 with a frame 102. The frame 102 is elevated and comprises springs and chains to absorb force. The method 200 may further comprise a Step 204 of powering the system 100 with a hydraulic power system 124. The hydraulic power system 124 negates the need for electrical components, thereby reducing fire hazards, allowing adjustability of the conveyor, blower, and shaker speeds, and improving portability. A Step 206 includes shaking a portion of the system in a fast up and down motion with a shaker screen. The shaker screen moves up and down about 3½ times per second, which is sufficient to flip and move the material to the next separating component, and also sufficient to enable smaller material to pass through the screens.

In some embodiments, a Step 208 comprises feeding a log yard waste material into the system 100 with a feeder conveyor 104. A Step 210 includes conveying the log yard waste material with a second conveyor 106. In some embodiments, a Step 212 may include disbursing the log yard waste material with a disbursement pad 108, the disbursement pad 108 configured to operatively connect to the shaker assembly, the disbursement pad 108 further configured to shake in a fast up and down motion. The disbursement pad 108 receives the log yard waste material directly from the second conveyor 106.

In some embodiments, a Step 214 comprises shaking the log yard waste material with an upper shaking screen 110, the upper shaking screen 110 defined by a plurality of upper openings configured to enable at least partial passage of a portion of the log yard waste material. Step 216 of accelerating the log yard waste material with an accelerator plate 114. The accelerator plate 114 is sloped, so that both small and large materials accelerate. A Step 218 includes dampening momentum and movement of the log yard waste material with a plurality of dampening fingers 112.

The method 200 may further comprise a Step 220 of decelerating the log yard waste material with a decelerator plate 116. The decelerator plate 116 is also sloped, but at a smaller angle. The larger material, such as large rocks carry such momentum, that the decelerating plate has little decelerating effect thereon. A Step 222 includes discharging a portion of the log yard waste material (large rocks) across the third conveyor 118 to a ground surface beneath the system. In some embodiments, a Step 224 comprises conveying the log yard waste material with a third conveyor 118. A Step 226 includes forcing air towards the log yard waste material with a first blower 126, the first blower 126 disposed proximally to the third conveyor 118.

In some embodiments, a Step 228 may include conveying the log yard waste material with a reverse fourth conveyor 136. It is significant to note that the reverse fourth conveyor 136 is at an angle so that the rocks roll and slide off of the bottom to the ground and the bark goes off of the top to the slide. There are also dampening fingers here to lay the bark down so it will go off of the top of the conveyor.

A Step 230 comprises enabling continuing movement of the log yard waste material with a slide 132. A Step 232 includes conveying the log yard waste material with a fifth conveyor 134. The method 200 may include yet another Step 234 of separating a portion of the log yard waste material at a first divider plate 138, the first divider plate 138 configured to separate the log yard waste material between a first back section and a first front section. The method 200 may further comprise a Step 236 of forcing air towards the log yard waste material with a second blower 144, the second blower 144 disposed proximally to the fifth conveyor 134, the second blower 144 configured to force a portion of the log yard waste material from the fifth conveyor 134 to the first divider plate 138.

A Step 238 includes shaking the log yard waste material with a lower shaking screen 148, the lower shaking screen 148 defined by a plurality of lower openings configured to enable at least partial passage of a portion of the log yard waste material. In some embodiments, a Step 240 comprises conveying the log yard waste material with a sixth conveyor 120, the sixth conveyor 120 configured to receive the log yard waste material from the lower shaking screen 148. A Step 242 includes forcing air towards the log yard waste material with a third blower 122, the third blower and second divider plate configured to force a portion of the log yard waste material from the sixth conveyor 120 to the fifth and seventh conveyors 134, 158.

In some embodiments, a Step 244 may include separating a portion of the log yard waste material at a second divider plate, the second divider plate 142 configured to receive a portion of the log yard waste material from the sixth conveyor 120. At this point, it is significant to note that at the divider plate 142 the bark material travels over the divider plate 142 to the fifth conveyor 134. The rock material drops off before the divider plate 142 to the seventh conveyor 158.

In some embodiments, as the rock material drops off of the seventh conveyor 158, the fourth blower 160, blows any remaining bark to the back of the third divider plate 152, and the rock falls to the front side of the third divider plate 152. This has an end result of ¾"-2" rock.

A Step 246 includes sending heavier material to a seventh conveyor 158 to fourth blower 160 and third divider plate 152, and sending lighter material on fifth conveyor 134 to second blower 144 and first divider plate 138. At the divider plate 142 the bark material travels over the divider plate to the fifth conveyor 134. The rock material drops off before the divider plate 142 to the seventh conveyor 158. As the rock material drops off of the seventh conveyor 158 the fourth blower 160, blows any remaining bark to the back of the third divider plate 152, and the rock falls to the front side of the third divider plate 152, with the end result being the ¾"-2" rock.

The method 200 also has a Step 248 conveying the log yard waste material with an eighth conveyor 140, the eighth conveyor 140 configured to receive a portion of the log yard waste material passing through the lower shaking screen 148. A final Step 250 includes conveying the log yard waste material with a ninth conveyor 146, the ninth conveyor 146 configured to receive the log yard waste material from the eighth conveyor 140, the ninth conveyor 146 further configured to enable discharge of a portion of the log yard waste material from the system 100. The fine granular material is discharged from the ninth conveyor 146.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A hydraulic log yard waste separation system, the system comprising:
a frame, the frame configured to support and elevate the system;
a hydraulic power system, the hydraulic power system configured to power the system;
a feeder conveyor, the feeder conveyor configured to enable discharge of a material;
a second conveyor, the second conveyor configured to join with the feeder conveyor, the second conveyor further configured to receive the material from the feeder conveyor, the second conveyor further configured to carry the material;
a disbursement pad, the disbursement pad configured to join with the second conveyor, the disbursement pad further configured to receive the material from the second conveyor, the disbursement pad further configured to shake in a generally fast, up and down motion;
an upper shaking screen, the upper shaking screen configured to join with the disbursement pad, the upper shaking screen defined by a plurality of upper openings configured to enable at least partial passage of a portion of the material, the upper shaking screen further configured to shake in a fast, up and down motion;
a plurality of dampening fingers, the plurality of dampening fingers configured to join with the upper shaking screen, the plurality of dampening fingers further configured to orient the material;
an accelerator plate, the accelerator plate configured to receive the material from the plurality of dampening fingers, the accelerator plate further configured to have an adjustable accelerating slope, wherein manipulating the slope of the accelerator plate enables the accelerator plate to help increase the velocity of the material;
a decelerator plate, the decelerator plate configured to join with the accelerator plate, the decelerator plate further configured to receive the material from the accelerator plate, the decelerator plate further configured to have an adjustable decelerating slope, wherein manipulating the slope of the decelerator plate enables the decelerator plate to help reduce the velocity of the material;
a third conveyor, the third conveyor configured to receive the material from the decelerator plate;
a first blower, the first blower disposed proximally to the third conveyor, the first blower configured to force air towards the material that disengages from the third conveyor;
a reverse fourth conveyor, the reverse fourth conveyor configured to receive the material from the third conveyor;
a slide, the slide configured to receive the material from the reverse fourth conveyor;
a first divider plate, the first divider plate disposed proximally to the fifth conveyor, the first divider plate further configured to separate the material between a first back section and a first front section;
a second blower, the second blower disposed proximally to the fifth conveyor, the second blower configured to force air towards the material that disengages from the fifth conveyor, the second blower further configured to force a portion of the material from the fifth conveyor to the first divider plate;
a lower shaking screen, the lower shaking screen configured to receive a portion of the material passing through the upper shaking screen, the lower shaking screen defined by a plurality of lower openings configured to enable at least partial passage of a portion of the material, the lower shaking screen further configured to shake in a generally fast, up and down motion;
a sixth conveyor, the sixth conveyor configured to receive the material from the lower shaking screen;
a fifth conveyor, the fifth conveyor configured to receive at least a portion of the material from the sixth conveyor;
a seventh conveyor, the seventh conveyor configured to receive at least a portion of the material from the sixth conveyor;
a third blower, the third blower disposed proximally to the sixth conveyor, the third blower configured to force air towards the material that disengages from the sixth conveyor, the third blower further configured to force a portion of the material from the sixth conveyor to the fifth conveyor and the seventh conveyor;
a second divider plate, the second divider plate disposed proximally to the sixth conveyor, the second divider further configured to receive a portion of the material from the sixth conveyor, the second divider plate further configured to separate the material between a second back section and a second front section, wherein a portion of the material separates to the seventh conveyor and a portion of the material separates to the fifth conveyor;
a third divider plate, the third divider plate disposed proximally to the seventh conveyor;
a fourth blower, the fourth blower disposed proximally to the third divider plate, the fourth blower configured to force air towards the material that disengages from the seventh conveyor, the fourth blower further configured to force a portion of the material from the seventh conveyor to the third divider plate;
an eighth conveyor, the eighth conveyor configured to receive the material from the upper shaking screen and the lower shaking screen;

a ninth conveyor, the ninth conveyor configured to receive the material from the eighth conveyor; and a tenth reverse conveyor.

2. The system of claim 1, further including a hydraulic bleed off motor control system, the hydraulic bleed off motor control system configured to regulate flow of the hydraulic fluid and release pressure from the hydraulic system.

3. The system of claim 2, wherein the frame is configured to rest on a base having dimensions of about 8 feet by 16 feet.

4. The system of claim 3, wherein the upper shaking screen and the lower shaking screen are sloped at about a 24 to 30 degree angle.

5. The system of claim 4, wherein the upper shaking screen and the lower shaking screen are configured to shake at about 3½ times per second.

6. The system of claim 5, wherein the reverse fourth conveyor is disposed at a slope between about a 17 to 26 degree angle.

7. The system of claim 6, wherein the second conveyor comprises a roller.

8. The system of claim 7, wherein the material is log yard waste, the log yard waste consisting of at least one of the following: large rocks, large bark, small rocks, small bark, and fine granules.

9. The system of claim 8, wherein the large rocks have a diameter of at least 2 inches.

10. The system of claim 9, wherein the large bark is at least 2 inches long.

11. The system of claim 10, wherein the small rocks have a diameter between ¾ inches and 2 inches.

12. The system of claim 11, wherein the fine granules have a diameter less than ¾ inches.

13. A hydraulic log yard waste separation system, the system comprising:

a frame, the frame configured to support and elevate the system;

a feeder conveyor, the feeder conveyor configured to enable discharge of a material;

a second conveyor, the second conveyor configured to join with the feeder conveyor, the second conveyor further configured to receive the material from the feeder conveyor, the second conveyor further configured to carry the material;

a disbursement pad, the disbursement pad configured to join with the second conveyor, the disbursement pad further configured to receive the material from the second conveyor, the disbursement pad further configured to shake in a generally fast, up and down motion;

an upper shaking screen, the upper shaking screen configured to join with the disbursement pad, the upper shaking screen defined by a plurality of upper openings configured to enable at least partial passage of a portion of the material, the upper shaking screen further configured to shake in a fast, up and down motion;

a plurality of dampening fingers, the plurality of dampening fingers configured to join with the upper shaking screen, the plurality of dampening fingers further configured to orient the material;

an accelerator plate, the accelerator plate configured to receive the material from the plurality of dampening fingers, the accelerator plate further configured to have an adjustable accelerating slope, wherein manipulating the slope of the accelerator plate enables the accelerator plate to help increase the velocity of the material;

a decelerator plate, the decelerator plate configured to join with the accelerator plate, the decelerator plate further configured to receive the material from the accelerator plate, the decelerator plate further configured to have an adjustable decelerating slope, wherein manipulating the slope of the decelerator plate enables the decelerator plate to help reduce the velocity of the material;

a third conveyor, the third conveyor configured to receive the material from the decelerator plate;

a first blower, the first blower disposed proximally to the third conveyor, the first blower configured to force air towards the material that disengages from the third conveyor;

a reverse fourth conveyor, the reverse fourth conveyor configured to receive the material from the third conveyor;

a slide, the slide configured to receive the material from the reverse fourth conveyor;

a first divider plate, the first divider plate disposed proximally to the fifth conveyor, the first divider plate further configured to separate the material between a first back section and a first front section;

a second blower, the second blower disposed proximally to the fifth conveyor, the second blower configured to force air towards the material on the fifth conveyor, the second blower further configured to force a portion of the material from the fifth conveyor to the first divider plate;

a lower shaking screen, the lower shaking screen configured to receive a portion of the material passing through the upper shaking screen, the lower shaking screen defined by a plurality of lower openings configured to enable at least partial passage of a portion of the material, the lower shaking screen further configured to shake in a generally fast, up and down motion;

a sixth conveyor, the sixth conveyor configured to receive the material from the lower shaking screen;

a fifth conveyor, the fifth conveyor configured to receive at least a portion of the material from the sixth conveyor;

a seventh conveyor, the seventh conveyor configured to receive at least a portion of the material from the sixth conveyor;

a third blower, the third blower disposed proximally to the sixth conveyor, the third blower configured to force air towards the material that disengages from the sixth conveyor, the third blower further configured to force a portion of the material from the sixth conveyor to the fifth conveyor and the seventh conveyor;

a second divider plate, the second divider plate disposed proximally to the sixth conveyor, the second divider further configured to receive a portion of the material from the sixth conveyor, the second divider plate further configured to separate the material between a second back section and a second front section, wherein a portion of the material separates to the seventh conveyor and a portion of the material separates to the fifth conveyor;

a third divider plate, the third divider plate disposed proximally to the seventh conveyor;

a fourth blower, the fourth blower disposed proximally to the third divider plate, the fourth blower configured to force air towards the material from the seventh conveyor, the fourth blower further configured to force a portion of the material from the seventh conveyor to the third divider plate;

an eighth conveyor, the eighth conveyor configured to receive the material from the upper shaking screen and the lower shaking screen;

a ninth conveyor, the ninth conveyor configured to receive the material from the eighth conveyor; and a tenth reverse conveyor.

14. The system of claim 13, further including a hydraulic power system, the hydraulic power system configured to power the system with hydraulic fluid.

15. The system of claim 14, wherein the hydraulic power system includes at least one of the following: a hydraulic reservoir, two fixed displacement vane pumps, a variable displacement vane pump, two pilot operated check valves, three electric solenoid valves, fourteen ball valves, fourteen pressure compensated flow controls, fourteen hydraulic motors, a return filter, and an accumulator.

16. The system of claim 13, further including a hydraulic bleed off motor control system, the hydraulic bleed off motor control system configured to regulate flow of the hydraulic fluid and release pressure from the hydraulic system.

17. The system of claim 13, wherein the upper shaking screen and the lower shaking screen are sloped at about a 24 to 30 degree angle.

18. The system of claim 13, wherein the upper shaking screen and the lower shaking screen are configured to shake at about 3½ times per second.

19. The system of claim 13, wherein the reverse fourth conveyor is disposed at a slope between about a 17 to 26 degree angle.

20. A method for separating log yard waste, the method comprising:

elevating the system with a frame;

powering the system with a hydraulic power system;

shaking a portion of the system in a fast up and down motion with a shaker screen;

feeding a log yard waste material into the system with a feeder conveyor;

conveying the log yard waste material with a second conveyor;

disbursing the log yard waste material with a disbursement pad, the disbursement pad configured to operatively connect to the shaker assembly, the disbursement pad further configured to shake in a fast up and down motion;

shaking the log yard waste material with an upper shaking screen, the upper shaking screen defined by a plurality of upper openings configured to enable at least partial passage of a portion of the log yard waste material;

accelerating the log yard waste material with an accelerator plate;

dampening momentum and movement of the log yard waste material with a plurality of dampening fingers;

decelerating the log yard waste material with a decelerator plate;

discharging a portion of the log yard waste material across the third conveyor to a ground surface beneath the system;

conveying the log yard waste material with a third conveyor;

forcing air towards the log yard waste material with a first blower, the first blower disposed proximally to the third conveyor;

conveying the log yard waste material with a conveyor number four, whereby the conveyor number four lets rocks drop off of the bottom and the bark goes to a slide;

enabling continuing movement of the log yard waste material with the slide;

conveying the log yard waste material with a fifth conveyor;

separating a portion of the log yard waste material at a first divider plate, the first divider plate configured to separate the log yard waste material between a first back section and a first front section;

forcing air towards the log yard waste material with a second blower, the second blower disposed proximally to the fifth conveyor, the second blower configured to force a portion of the log yard waste material from the fifth conveyor to the first divider plate;

shaking the log yard waste material with a lower shaking screen, the lower shaking screen defined by a plurality of lower openings configured to enable at least partial passage of a portion of the log yard waste material;

conveying the log yard waste material with a sixth conveyor, the sixth conveyor configured to receive the log yard waste material from the lower shaking screen;

forcing air towards the log yard waste material with a third blower, the third blower and second divider plate configured to force a portion of the log yard waste material from the sixth conveyor to the fifth and seventh conveyors;

separating a portion of the log yard waste material at a second divider plate, the second divider plate configured to receive a portion of the log yard waste material from the sixth conveyor;

forcing air towards the log yard waste material with a fourth blower, the fourth blower configured to force air towards the log yard waste material on the seventh conveyor, the fourth blower further configured to force a portion of the log yard waste material from the seventh conveyor to the third divider plate;

conveying the log yard waste material with a fifth conveyor, the fifth conveyor configured to receive a portion of the log yard waste material, such as bark, from the second divider plate; and conveying the log yard waste material with an eighth conveyor, the eighth conveyor configured to receive the log yard waste material from the upper and lower shaker screens the eighth conveyor further configured to enable discharge a portion of the log yard waste material to a ninth conveyor and then out to the ground.

* * * * *